US010248953B2

(12) United States Patent
Salama et al.

(10) Patent No.: US 10,248,953 B2
(45) Date of Patent: Apr. 2, 2019

(54) SYSTEMS AND METHODS FOR PROVIDING TOKENIZED TRANSACTION ACCOUNTS

(71) Applicant: The Toronto-Dominion Bank, Mississsauga (CA)

(72) Inventors: Hisham I. Salama, Charlotte, NC (US); Lauren Van Heerden, Bedford, NH (US); Orin Del Vecchio, Richmond Hill (CA); Paul Mon-Wah Chan, Markham (CA); Jonathan K. Barnett, Oakville (CA); Jakub Danielak, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 366 days.

(21) Appl. No.: 14/510,969

(22) Filed: Oct. 9, 2014

(65) Prior Publication Data
US 2015/0100495 A1 Apr. 9, 2015

Related U.S. Application Data

(60) Provisional application No. 61/888,653, filed on Oct. 9, 2013.

(51) Int. Cl.
*G06Q 20/34* (2012.01)
*G06Q 20/20* (2012.01)
(Continued)

(52) U.S. Cl.
CPC ........... *G06Q 20/405* (2013.01); *G06Q 20/10* (2013.01); *G06Q 20/12* (2013.01); *G06Q 20/20* (2013.01);
(Continued)

(58) Field of Classification Search
CPC ................................................... G06Q 20/405
See application file for complete search history.

(56) References Cited

U.S. PATENT DOCUMENTS 6,317,729 B1    11/2001  Camp et al.
6,422,462 B1 *   7/2002  Cohen .................. G06Q 20/105
                                                              705/41
(Continued)

FOREIGN PATENT DOCUMENTS

CN        103078913          5/2003
EP          2530868         12/2012
(Continued)

OTHER PUBLICATIONS

Zhang et al., Location-based Authentication and Authorization Using Smart Phones, 2012, IEEE, 2012 IEEE 11th International Conference on Trust, Security and Privacy in Computing and Communications, pp. 1285-1292 (Year: 2012).*
(Continued)

*Primary Examiner* — Zeshan Qayyum
*Assistant Examiner* — Eduardo Castilho
(74) *Attorney, Agent, or Firm* — Duane Morris LLP

(57) ABSTRACT

The disclosed embodiments include methods and systems for providing tokenized transaction accounts. In one embodiment, a computer-implemented method is provided that may include generating, by one or more processors, a first tokenized transaction account from a first transaction account associated with a first user. The method may also include providing the first tokenized transaction account to a client device associated with the first user for storage in the client device and use in transactions. The method may also include updating the first tokenized transaction account based on one or more conditions and providing the updated first tokenized transaction account to the client device for storage and use in a subsequent transaction.

33 Claims, 9 Drawing Sheets

(51) Int. Cl.
*G06Q 20/40* (2012.01)
*G06Q 20/10* (2012.01)
*G06Q 20/12* (2012.01)
*G06Q 20/38* (2012.01)

(52) U.S. Cl.
CPC ......... *G06Q 20/34* (2013.01); *G06Q 20/3827* (2013.01); *G06Q 20/3829* (2013.01); *G06Q 20/38215* (2013.01)

(56) References Cited

U.S. PATENT DOCUMENTS

| | | | | |
|---|---|---|---|---|
| 6,516,056 | B1* | 2/2003 | Justice | G06Q 20/4016 379/114.01 |
| 7,664,699 | B1* | 2/2010 | Powell | G06Q 20/10 705/35 |
| 8,355,982 | B2 | 1/2013 | Hazel et al. | |
| 9,210,167 | B1* | 12/2015 | Lafuente | H04L 63/0838 |
| 2003/0028481 | A1* | 2/2003 | Flitcroft | G06Q 20/00 705/39 |
| 2003/0182242 | A1* | 9/2003 | Scott | G06Q 10/04 705/65 |
| 2004/0210449 | A1* | 10/2004 | Breck | G06Q 20/40 705/39 |
| 2005/0138388 | A1 | 6/2005 | Paganetti et al. | |
| 2006/0237531 | A1* | 10/2006 | Heffez | G06Q 20/32 705/44 |
| 2007/0114274 | A1* | 5/2007 | Gibbs | G06Q 20/12 235/380 |
| 2008/0040271 | A1* | 2/2008 | Hammad | G06Q 20/20 705/41 |
| 2008/0091617 | A1 | 4/2008 | Hazel et al. | |
| 2008/0191007 | A1* | 8/2008 | Keay | G06Q 20/403 235/379 |
| 2008/0283591 | A1* | 11/2008 | Oder, II | G06Q 20/20 705/35 |
| 2009/0164354 | A1* | 6/2009 | Ledbetter | G06Q 20/12 705/30 |
| 2009/0292631 | A1* | 11/2009 | Wells | G06Q 20/04 705/30 |
| 2010/0153451 | A1* | 6/2010 | Delia | G06Q 20/40 707/781 |
| 2010/0185545 | A1 | 7/2010 | Royyuru et al. | |
| 2010/0257612 | A1 | 10/2010 | McGuire et al. | |
| 2011/0066493 | A1* | 3/2011 | Faith | G06Q 20/40 705/14.49 |
| 2011/0126002 | A1 | 5/2011 | Fu et al. | |
| 2011/0154466 | A1 | 6/2011 | Harper et al. | |
| 2011/0154467 | A1 | 6/2011 | Bomar et al. | |
| 2011/0178863 | A1* | 7/2011 | Daigle | G06Q 30/0231 705/14.31 |
| 2012/0016731 | A1 | 1/2012 | Smith et al. | |
| 2012/0018511 | A1 | 1/2012 | Hammad | |
| 2012/0030047 | A1 | 2/2012 | Fuentes et al. | |
| 2012/0041881 | A1 | 2/2012 | Basu et al. | |
| 2012/0131354 | A1 | 5/2012 | French | |
| 2012/0321078 | A1 | 6/2012 | Chambers et al. | |
| 2012/0233005 | A1* | 9/2012 | White | G06Q 20/20 705/18 |
| 2012/0265631 | A1 | 10/2012 | Cronic et al. | |
| 2012/0290376 | A1 | 11/2012 | Dryer et al. | |
| 2013/0013507 | A1 | 1/2013 | Browning et al. | |
| 2013/0031006 | A1 | 1/2013 | McCullagh et al. | |
| 2013/0110658 | A1 | 5/2013 | Lyman et al. | |
| 2013/0159178 | A1 | 6/2013 | Colon et al. | |
| 2013/0159186 | A1 | 6/2013 | Brudnicki et al. | |
| 2013/0173474 | A1 | 7/2013 | Ranganathan et al. | |
| 2013/0179952 | A1 | 7/2013 | O'Donnell et al. | |
| 2013/0198080 | A1 | 8/2013 | Anderson et al. | |
| 2013/0254052 | A1 | 9/2013 | Royyuru et al. | |
| 2013/0254102 | A1 | 9/2013 | Royyuru | |
| 2014/0258135 | A1* | 9/2014 | Park | G06Q 20/382 705/75 |
| 2014/0279504 | A1* | 9/2014 | Cook | G06O 20/385 705/44 |
| 2014/0379576 | A1* | 12/2014 | Marx | G06Q 20/35785 705/44 |
| 2015/0032627 | A1* | 1/2015 | Dill | G06Q 20/385 705/44 |
| 2015/0095240 | A1* | 4/2015 | Specogna | G06Q 20/385 705/72 |
| 2015/0254650 | A1* | 9/2015 | Bondesen | G06Q 20/3674 705/67 |

FOREIGN PATENT DOCUMENTS

| | | |
|---|---|---|
| WO | WO 2013056104 | 4/2013 |
| WO | WO 2013163251 | 4/2013 |
| WO | WO 2013163257 | 10/2013 |

OTHER PUBLICATIONS

Katta et al., "Model for Token Based Secure Transaction in ATM Networks," IJCSET, vol. 1, No. 7, 2011, pp. 395-398.

Rashid, "Impact of Automated Clearing House: A Utilitarian Overview," Bangladesh Research Foundation Journal, vol. 1, No. 2, 2012, pp. 149-156.

Cha et al., "Design of NFC Based Micro-payment to Support MD Authentication and Privacy for Trade Safety in NFC Applications," Seventh International Conference on Complex, Intelligent, and Software Intensive Systems, Jul. 2013, pp. 710-713.

Kadambi et al., "Near-field communication-based secure mobile payment service," Proceedings of the 11th International Conference on Electronic Commerce, 2009, pp. 142-151.

Yang et al., "Provable Data Possession of Resource-Constrained Mobile Devices in Cloud Computing," Journal of Networks, vol. 6, No. 7, 2011, pp. 1033-1040.

Yang et al., "Self-organized network-layer security in mobile ad hoc networks," Proceedings of the 2002 ACM Workshop on Wireless Security, 2002, pp. 11-20.

* cited by examiner

| 600 | User 1 Transaction Account 1 | User 1 Transaction Account 2 | User 2 Transaction Account 1 | User 3 Transaction Account 1 |
|---|---|---|---|---|
| Condition 1 (Frequency of Use) | Low (e.g., > 5 times a week) | High (e.g., once a week) | Medium (e.g., 3-5 times a week) | Low (e.g., > 5 times a week) |
| Condition 2 (User profile risk level) | Low | Low | High | Medium |
| Condition 3 (Risk level of location of current transaction) | High | N/A | Low | Medium |
| Condition 4 (Risk level associated with pattern of previous locations for account) | High | Medium | Low | High |
| Condition 5 (Risk level of type of product/service involved in current purchase) | High | N/A | High | Low |
| Condition 6 (Risk level of business entity involved with current transaction) | High | N/A | High | Low |
| Condition 7 (Risk level of business entities involved with one or more previous transactions) | High | High | Low | Low |

FIG. 6

SYSTEMS AND METHODS FOR PROVIDING TOKENIZED TRANSACTION ACCOUNTS

This application claims the benefit of U.S. Provisional Patent Application No. 61/888,653, filed Oct. 9, 2013, which is incorporated herein by reference to its entirety.

BACKGROUND

Technical Field

The present disclosure generally relates to systems and methods for securing information, and more particularly, and without limitation, to systems and methods for tokenizing authentication credentials.

Background

Today, information is routinely passed between local and remote systems, devices, and networks. Protecting that information has increasingly become a concern for businesses and users. This is especially true in the financial services industry, where financial account information is exchanged daily over the Internet and between mobile devices and point of sale devices. Some approaches include encrypting the information involved in financial transactions. While providing some protection, security issues still exist when the information is compromised or communicated in high security risk environments. Aspects of the disclosed embodiments address these and other concerns regarding securing information.

SUMMARY

The disclosed embodiments include methods and systems for providing tokenized transaction accounts. In one embodiment, a system includes a storage device and at least one processor coupled to the storage device. The storage device may store software instructions for controlling the at least one processor when executed by the at least one processor, and the at least one processor may be operative with the software instructions and may be configured to identify at least one first condition triggering an update to a first tokenized transaction account. In some aspects, the first tokenized transaction account may reflect a secure digital representation of a first transaction account associated with a first user and may be associated with at least one first purchase functionality. The at least one processor may be further configured to obtain first data indicative of at least one of a pending or prior purchase transaction involving the first transaction account, and determine whether the first data satisfies the at least one first condition. When the obtained data is determined to satisfy the at least one first condition, the at least one processor may be further configured to modify at least a portion of the first tokenized transaction account to generate an updated first tokenized transaction account, the updated first tokenized transaction account being associated with a second purchase functionality. The at least one processor may be further configured to provide the updated first tokenized transaction account to the client device for storage and use in purchase transactions in accordance with the second purchase functionality.

The disclosed embodiments may also include a computer-implemented method that identifies, by the at least one processor, at least one first condition triggering an update to a first tokenized transaction account. In some aspects, the first tokenized transaction account may reflect a secure digital representation of a first transaction account associated with a first user and may be associated with at least one first purchase functionality. The method also includes obtaining, by the at least one processor, first data indicative of at least one of a pending or prior purchase transaction involving the first transaction account, and determining, by the at least one processor, whether the first data satisfies the at least one first condition. When the obtained data is determined to satisfy the at least one first condition, the method includes modifying, by the at least one processor, at least a portion of the first tokenized transaction account to generate an updated first tokenized transaction account, the updated first tokenized transaction account being associated with a second purchase functionality. In addition, the method includes providing, by the at least one processor, the updated first tokenized transaction account to the client device for storage and use in purchase transactions in accordance with the second purchase functionality.

In other embodiments, a tangible, non-transitory computer-readable medium may store instructions that, when executed by at least one processor, cause the at least one processor to perform a method that includes identifying at least one first condition triggering an update to a first tokenized transaction account. In some aspects, the first tokenized transaction account may reflect a secure digital representation of a first transaction account associated with a first user and may be associated with at least one first purchase functionality. The method also includes obtaining first data indicative of at least one of a pending or prior purchase transaction involving the first transaction account, and determining, by the at least one processor, whether the first data satisfies the at least one first condition. When the obtained data is determined to satisfy the at least one first condition, the method includes modifying at least a portion of the first tokenized transaction account to generate an updated first tokenized transaction account, the updated first tokenized transaction account being associated with a second purchase functionality. In addition, the method includes providing the updated first tokenized transaction account to the client device for storage and use in purchase transactions in accordance with the second purchase functionality.

Additional advantages of the disclosed embodiments will be set forth in part in the description that follows, and in part will be obvious from the description, or may be learned by practice of the invention. The advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIG. 6 is a block diagram of exemplary data structure of conditions consistent with disclosed embodiments.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
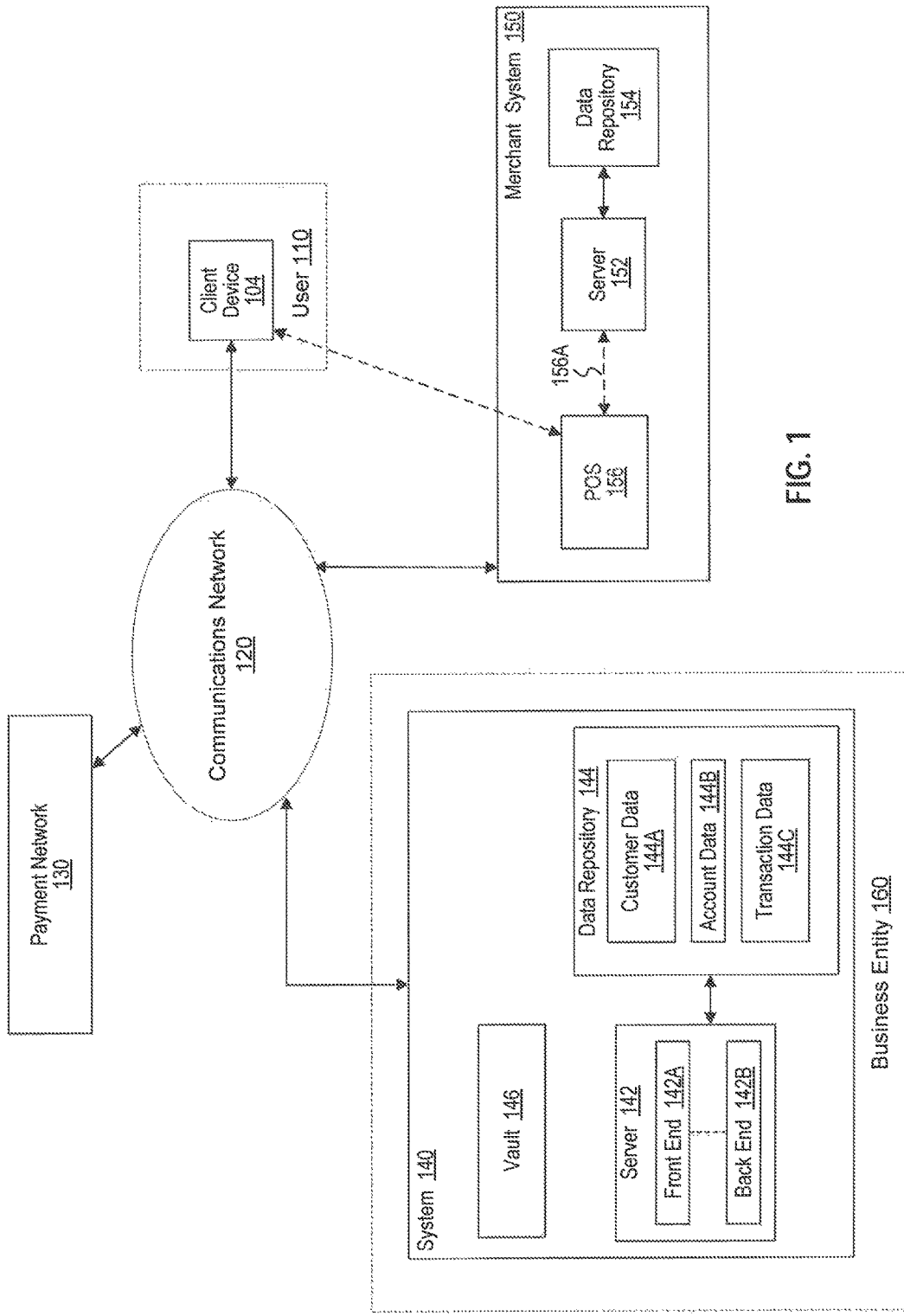
FIG. 1 depicts an exemplary computing environment consistent with disclosed embodiments.

FIG. 1 illustrates an exemplary computing environment 100 consistent with certain disclosed embodiments. In one aspect, computing environment 100 may include a client device 104, a payment network 130, a system 140, a merchant system 150, and a communications network 120 connecting one or more of the components of environment 100.

In one embodiment, system 140 may be one or more computer systems configured to process and store information, and execute software instructions to perform processes consistent with the disclosed embodiments. In certain exemplary embodiments, although not required, system 140 may be associated with a business entity 160. In certain embodiments, business entity 160 may be any type of business entity, such as a financial institution, a travel services business, a hotel or lodging business, or any other type of business entity. For example, system 140 may be a system associated with a commercial bank, an investment bank, a provider of a payment instrument or financial service accounts, etc. In some embodiments, a financial service account may be a check, savings, credit, debit, and/or a reward or loyalty account. In some aspects, a payment instrument may include, but is not limited to, a personal or corporate credit card, a debit card, a prepaid credit or debit card, or check instruments.

While certain aspects of the disclosed embodiments are described in connection with business entity 160 as a financial institution that provides financial service accounts to user 110 (and other users) and processes financial transactions associated with those financial service accounts, the disclosed embodiments are not so limited. In other embodiments, system 140 may be associated with a business entity 160 that provides accounts for users for other types of transactions, such as hotel guest accounts, passport or travel identification accounts, location access identification accounts (e.g., employment, government identification accounts, educational institution related accounts (e.g., student identification, meal cards, etc.), and the like.

In certain embodiments, system 140 may include one or more servers 142 and one or more data storages, such as data repository 144. Server 142 may be, for example, a computing system that processes, among other things, transactions, and thus for exemplary purposes only, may be referred to as a transaction server. A transaction may include financial transactions (e.g., purchase transactions, banking transactions, etc.), or other forms of transactions (e.g., access to a location, check out transactions of material, products, goods, etc., such as library transactions, etc.).

In one embodiment, server 142 may include a front end 142A, and a back end 142B in communication with front end 142A, although the configuration of server 142 is not limited to such configurations. In one example, front end 142A and back end 142B of server 142 may be incorporated into a single computer, a single server, or any additional or alternate computing device apparent to one or skill in the art. In other embodiments, front end 142A and backend 142B may be distributed computing devices. Further, in one embodiment, front end 142A may be one or more software programs, such as a software application (e.g., a web service) executed by one or more processors included in server 142. Similarly, backend 142B may be one or more software programs executed by one or more processors included in server 142. Server 142 is not limited to such configurations. In additional embodiments, front end 142A software can be executed by a server or computing system separate from a server or computing system that executes back end 142B.

Server 142 may be configured to execute software instructions to perform one or more processes consistent with the disclosed embodiments. In one embodiment, client device 104 may exchange information and parameters facilitating execution of one or more transactions associated with system 140. In one embodiment, where business entity 160 is a financial institution that provides financial service accounts and system 140 is configured to perform financial service account transaction processes, transactions may include, but are not limited to, a purchase or sale of goods or services, a transfer of funds between financial accounts (e.g., checking, savings, investment, etc.), a payment of a bill, a purchase or sale of a financial instrument or security, a deposit or withdrawal of funds, or an application for credit.

Figure 2:
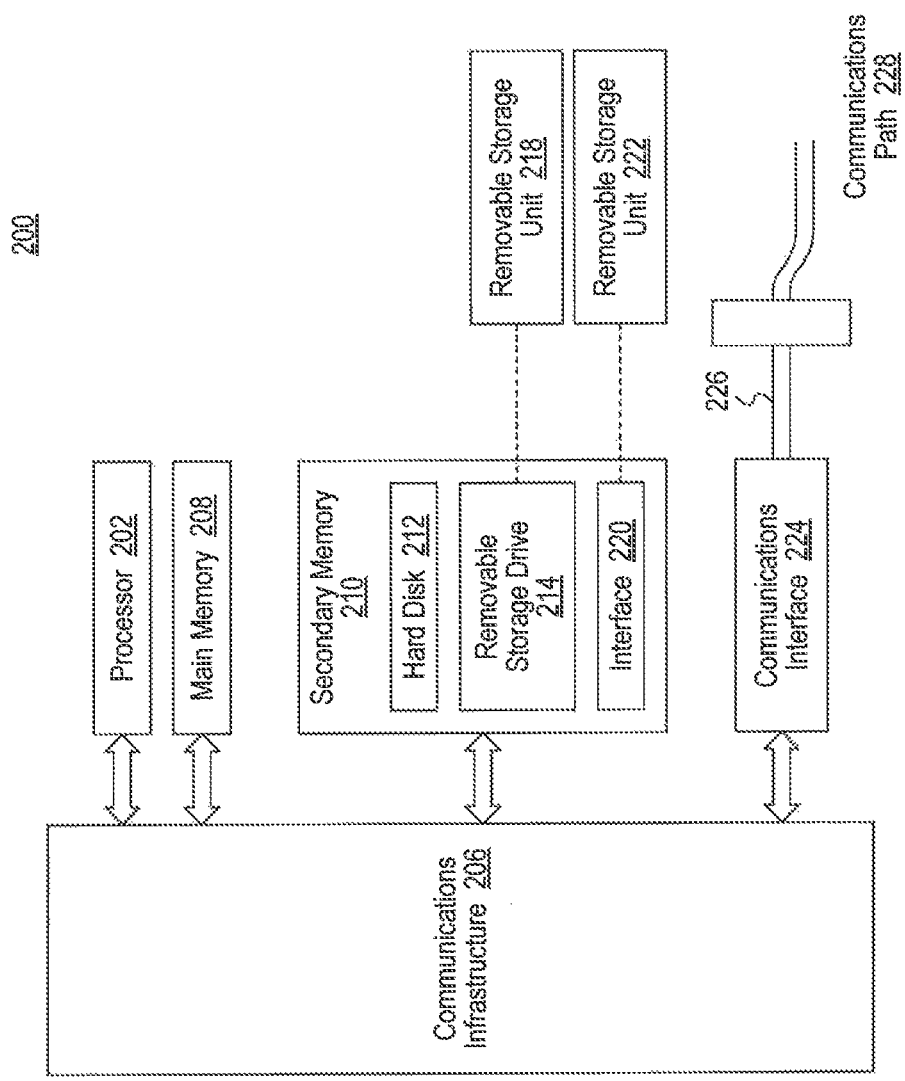
FIG. 2 depicts an exemplary computing system consistent with the disclosed embodiments.

Server 142 may be implemented with one or more processors or computer-based systems, such as for example, a computer-system 200 of FIG. 2).

Data repository 144 may be one or more data storages configured to store information consistent with the disclosed embodiments. In one aspect, data repository 144 may include customer data 144A, account data 144B, and transaction data 144C. In one aspect, customer data 144A may include one or more data records uniquely identifying one or more users 110 of business entity 160 associated with system 140. By way of example, a customer of a financial institution (e.g., business entity 160) may access a web page associated with system 140 (e.g., through a web server executed by front end 142A), and subsequently register for online banking services and provide data. The data may be linked to the customer and stored within customer data 144A.

In certain aspects, customer data 144A may include personal information associated with a user 110 (e.g., a name, home address, or date of birth), demographic information (e.g., educational level, income level), government-issued identifiers (e.g., driver's license numbers or Social Security numbers), employment information (e.g., employer name or address), and/or contact information (e.g., e-mail addresses, home numbers, work numbers, or mobile numbers). Customer data 144A may also include one or more authentication credentials associated with registered customers of the issuing bank. For example, the authentication credentials may include, but are not limited to, a user name, a user-specified password, a system-generated password, or an alphanumeric identification number (e.g., a PIN number) specified by the user or assigned by system 140. Other types of customer information may be stored and used by the disclosed embodiments.

Additionally or alternatively, customer data 144A may include information facilitating enhanced authentication techniques. For example, customer data 144A may store information identifying a security question associated with a customer (e.g., "What is your mother's maiden name?") and the customer's registered answer to the security question. Customer data 144A may also include information identifying a particular security image or avatar selected by the user and displayed by the user during the authentication process.

Customer data 144A may include client device identification information identifying one or more client devices 104 registered to user 110. In one embodiment, the user may provide the client device identification information (e.g., a mobile telephone number provided by the user when registering for online banking services). Alternatively, server 142 may be configured to execute processes that automatically collect client device identification information (e.g., collecting an Internet Protocol (IP) address associated with the customer's smartphone).

In certain aspects, account data 144B may include account identification information identifying one or more accounts of customers of a financial institution (e.g., business entity 160) associated with system 140. In one embodiment, account identification information may include information identifying one or more financial service accounts. For example, financial service accounts consistent with the disclosed embodiments may include, but are not limited to, a checking account, a savings account, a revolving credit line, an account linked to a credit or debit card, a brokerage account, and any additional or alternate account provided or supported by the issuing bank. In other embodiments, account data 144B may include information identifying investment portfolios held by one or more customers of the financial institution (e.g., positions in one or more securities held by the customers). Information within account data 144B may also identify, for a single customer, one or more accounts associated with the customer and account data corresponding to the accounts (e.g., account, expiration date information, and/or card security codes, account balance information, and/or credit limit information).

In other aspects, account data 144B may include account information associated with nonfinancial service accounts, such as membership accounts for certain services or activities (e.g., gym membership, prescription drug information, library card, employment identification, student account information, etc.).

Transaction data 144C may include information identifying transactions involving one or more customers or accounts of business entity 160 associated with system 140. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial institution or other entity.

For example, system 140 may be configured to execute software instructions providing a digital financial service portal enabling a user 110 (e.g., "customer") to perform financial service type transactions. In one embodiment, the digital portal may enable the customer to transfer funds between a first customer account to a second account, to schedule automatic bill payment services (e.g., select an amount and periodic payment date for making payments to an identified payee from the customer's selected financial account), to purchase goods or services, and other known types of online financial service processes. For instance, server 142 may generate a data record within transaction data 144C corresponding to the particular service the customer initiates, such as an initiated transfer of funds, and may populate the data record with information associated with the initiated transaction.

As an example, transaction information for a funds transfer may include, but is not limited to, a unique identifier associated with the fund transfer transaction, a timestamp of the transaction, and transaction parameter information (e.g., a source account, a target account, a transaction date, and an amount of transfer). For another example, transaction information associated with the purchase or sale of a good from a physical retailer may include, but is not limited to, the location of the retailer, the type of retailer, the type of goods purchased, and the amount of the purchase.

In certain embodiments, system 140 may include a vault 146. Vault 146 may be one or more computing systems that process and store information and execute software instructions to perform one or more processes consistent with the disclosed embodiments. In other embodiments, vault 146 may be software instructions stored in one or more memory devices that are executed by one or more processors (e.g., processor(s) associated with server 142 or other computing device). In certain aspects, vault 146 may be configured to perform tokenization processes consistent with certain embodiments. For example, vault 146 may be configured to create one or more tokens that reflect a secure rendition of information associated with user accounts generated, processed, maintained, and/or managed by system 140 (e.g., financial service accounts, etc.). Vault 146 may be configured to update, replace, refresh, modify, and/or delete tokens and tokenized transaction accounts in accordance with the disclosed embodiments. In certain aspects, vault 146 may receive information from one or more other entities in computing environment 100, such as payment network 130. For example, payment network 130 may provide an authorization request to vault 146 that includes a tokenized transaction account involved in a transaction.

In other aspects, vault 146 may be configured to provide information identifying tokens and/or a tokenized transaction account to one or more other entities in computing environment 100 (e.g., as payment network 130). By way of example, the information may identify certain data fields and/or portions of certain data fields within received financial transaction data that have been tokenized by vault 146 in a specific manner. In one embodiment, payment network 130 may identify the tokens and/or tokenized transaction accounts based on the information provided by vault 146.

In further embodiments, vault 146 may be configured to update, replace, refresh, modify, and/or delete locks and/or tokens generated by a user. For instance, the user-generated locks and/or tokens may provide another individual with temporary access to portions of the user's stored data, a residence of the user, a vehicle or the user, or any additional or alternate data or item secured by the user. In other instances, the user-generated tokens and/or locks may enable a user to exert control over actions (e.g., purchases) taken by other users. By way of example, vault 146 may be configured to update, replace, refresh, modify, and delete a parent-generated token and/or lock authorizing a purchase made by a child at retailer X, but not at retailer Y.

Vault 146 may also communicate with components of system 140, such as server 142 and data repository 144, or other computing components of system 140, to perform processes consistent with the disclosed embodiments.

Merchant system 150 may be one or more computer systems associated with a business entity that provides products and/or services. In one example, merchant system 150 may be associated with a retailer having one or more physical retail locations disposed within a geographic area (e.g., a "physical retailer"). Merchant system 150 may be a retailer that provides electronic or a-commerce type retail services. In one example, merchant system 150 may be an electronic or an e-commerce retailer that interacts with consumers through corresponding web interfaces, digital wallets, or retailer-specific application programs (e.g., mobile "apps"). In one embodiment, one or more client devices 104 can exchange information with merchant system 150 to purchase one or more goods and/or services using various payment instruments, such as mobile payment processes. Merchant system 150 may exchange information with payment network 130 and system 140 over communications network 120 to obtain authorization for such purchase instruments. For example, user 110 may perform a mobile payment using client device 104 and point-of-sale (POS) device using known mobile payment processes and components.

In other embodiments, merchant system 150 may reflect a system and be associated with any type of business entity that may receive and use transaction accounts to perform some service or provide some product. For example, system 150 may be associated with a business, a place of work, a government agency, an academic institution, a library, a travel services business (e.g., passport or airport security identification services business), car rental agency, etc. In such embodiments, depending on the nature of the business provided, system 150 may use different devices, and/or require different authorization levels, to receive the transaction account from client device 104 (e.g., a reader device in place of POS 156).

In one embodiment, merchant system 150 may include a merchant server 152, a data repository 154, and point-of-sale (POS) module 156. Although not depicted in FIG. 1, merchant server 152 may include a front end and a back end disposed in communication with the front end as previously discussed. In certain aspects, the front and back ends may be incorporated into a hardware unit (e.g., a single computer, a single server, or any additional or alternate computing device apparent to one skilled in the art). In other embodiments, the front end may be a software application, such as a web service, executing on merchant server 152. Merchant server 152 is not limited to such configurations, however, and the front end may be executed on any computer or server separate from the back end.

In one embodiment, POS 156 may be one or more point-of-sale devices configured to perform known point-of-sale processes. POS module 156 may be disposed at a physical location in a merchant location associated with merchant system 150, such as a location where user 110 may provide payment for goods and/or services (e.g., at a cash register at the merchant) using, for example, client device 104. The disclosed embodiments are not limited to such physical POS modules, and in additional embodiments, POS module 156 may be a software module executed by merchant server 152, servers 142 or 160, or one or more of client devices 104. Further, POS 156 may represent a device communicatively coupled to one or more of client device 104 (e.g., a Squa to provide mobile point-of-sale and payment services. POS 156 may also facilitate mobile payment systems through a mobile wallet technology such as, for example, Google Wallet or other known electronic or digital wallet technologies.

In some embodiments, a communications link may facilitate communications between POS 156, client device 104, payment network 130, system 140, and/or merchant server 152 or some other hardware-based device. The communications link may include communications network 120, or may include a separate communication link, such as, a wired cable connection, a wireless connection, a Bluetooth connection, and/or a near field communication (NFC) connection. Additionally or alternatively, POS 156 may communicate with client device 104, merchant server 152, and system 140 across communications network 120 using any of a number of communications protocols, such as hypertext transfer protocol (HTTP) and transmission control protocol/Internet protocol (TCP/IP).

In one embodiment, a merchant may be associated with one or more point-of-sale devices configured to provide payment services and to perform known point of sale processes. Server 152 and/or POS 156 may be implemented with a processor or computer-based system (e.g., computer-system 200 of FIG. 2), may be configured to execute software instructions to transmit and receive data across network 120, or another communication link, using any of the communications protocols outlined herein. For instance, POS 156 may directly communicate with network 120 through a corresponding interface, and additionally or alternatively, may access communication network 120 via a server associated with the merchant (e.g., via communications link to merchant server 152 of FIG. 1).

Client device 104 may be one or more client devices. In certain embodiments, client device 104 may be associated with one or more users 110. In one example, user 110 may use client device 104 to perform one or more processes consistent with the disclosed embodiments. For example, user 110 may use client device 104 to perform a transaction involving an account associated with the user and provided, maintained, managed, and/or processed by system 140. In certain aspects, client device 104 can include, but is not limited to, a personal computer, a laptop computer, a tablet computer, a notebook computer, a hand-held computer, a personal digital assistant, a portable navigation device, a mobile phone, a wearable device, an embedded device, a smart phone, a set top box, third party portals, an optical disk player (e.g., a DVD player), a digital video recorder (DVR), and any additional or alternate computing device, and may be operable to transmit and receive data across network 120. Client device 104 may be implemented with one or more processors or computer-based systems, such as for example, computer-system 200 of FIG. 2.

Further, although computing environment 100 is illustrated in FIG. 1 with one client device 104, that the disclosed embodiments may include a plurality of client devices 104. Similarly, although computing environment 100 is illustrated in FIG. 1 with a single merchant system 150, system 140, user 110, and payment network 130, persons of ordinary skill in the art will recognize that environment 100 may include any number of additional merchant systems 150, systems 140, users 110, and payment networks 130.

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

In certain embodiments, payment network 130 may be one or more computer systems associated with a payment technology, such as, for example, a financial account payment service provider (e.g., credit card payment networks, such as VISA™, Mastercard™, etc.). Payment network 130 may include one or more computer systems that may include one or more processors, server(s) including processor(s), and data storages. For example, payment network 130 may be implemented with one or more processors or computer-based systems, such as for example, computer-system 200 of FIG. 2.

Payment network 130 may also include interfaces that provide communications with components of environment 100, including communications network 120. For example, payment network 130 may be configured with components and software that, when executed, may receive transaction data from merchant system 150 or client device 104, process the received transaction data, and provide the processed transaction data to system 140 (e.g., via communications network 120). In one example, merchant system 150 may send financial transaction data relating to a purchase transaction involving a sale of goods at merchant POS 156 to payment network 130. Payment network 130 may be configured to process the received transaction data in accordance with known payment network processes and technologies and send the transaction data to system 140 (e.g., to server 142) for transaction authentication and confirmation. In accordance with some embodiments, payment network 130 may be configured to perform tokenization check processes that determine whether a transaction involves a user account tokenized by system 140, and thus may intelligently and automatically route the transaction data to vault 146 for subsequent processing. In certain aspects, payment network 130 may be configured to determine whether transaction data involves tokenized data, and if not, provides the transaction data to server 142 for processing. In other aspects, payment network 130 may be configured to provide the transaction data to vault 146 instead of server 142 if it determines the transaction data includes tokenized data in accordance with the disclosed embodiments.

In certain embodiments, one or more of server 142, payment network 130, and merchant server 152 may include a general purpose computer (e.g., a personal computer, network computer, server, or mainframe computer) having one or more processors selectively activated or reconfigured by a computer program. In additional embodiments, one or more of server 142, payment network 130, and merchant server 152 may be incorporated as corresponding nodes in a distributed network, and additionally or alternatively, as corresponding networked servers in a cloud-computing environment. Furthermore, server 142, payment network 130, and/or merchant server 152 may communicate via network 120 with one or more additional servers (not shown), which facilitate the distribution of processes for parallel execution by the additional servers.

FIG. 2 illustrates an exemplary computer system 200 with which embodiments consistent with the present disclosure may be implemented. In certain embodiments, computer system 200 may reflect computer systems associated with server 142, server 152, payment network 130, or client device 104. In certain embodiments, computer system 200 may include one or more processors 202. Processor 202 may be connected to a communication infrastructure 206, such as a bus or communications network, e.g., a communications network 120 depicted in FIG. 1.

Computer system 200 may also include a main memory 208, for example, random access memory (RAM), and may include a secondary memory 210. Memory 208 may represent a tangible and non-transitory computer-readable medium having stored therein computer programs, sets of instructions, code, or data to be executed by processor 202. Secondary memory 210 may include, for example, a hard disk drive 212, and/or a removable storage drive 214, representing a magnetic tape drive, flash memory, an optical disk drive, CD/DVD drive, etc. The removable storage drive 214 may read from and/or write to a removable storage unit 218 in a well-known manner. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Communications interface 224 may transfer software and data in the form of signals 226, which may be electronic, electromagnetic, optical or other signals capable of being received by communications interface 224. These signals 226 may be provided to communications interface 224 via a communications path (i.e., channel 228). Channel 228 carries signals 226 and may be implemented using wire, cable, fiber optics, RF link, and/or other communications channels. In a disclosed embodiment, signals 226 comprise data packets sent to processor 202. Information representing processed packets can also be sent in the form of signals 226 from processor 202 through communications path 228.

In certain embodiments in connection with FIG. 2, the terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which may respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

Furthermore, the computer-implemented methods described herein can be implemented on a single processor of a computer system, such as processor 202 of system 200. In additional embodiments, however, these computer-implemented methods may be implemented using one or more processors within a single computer system, and additionally or alternatively, these computer-implemented methods may be implemented on one or more processors within separate computer systems linked via a network.

The disclosed embodiments include systems and methods for providing, modifying, deleting, and/or replacing tokens. In one embodiment, a token may represent a secure representation of information associated with an account associated with user 110 and provided by system 140 and/or business entity 160. In certain aspects, system 140 may be configured to perform processes that generate a token for a transaction account using data manipulation techniques known to those skilled in the art.

Figure 3A:
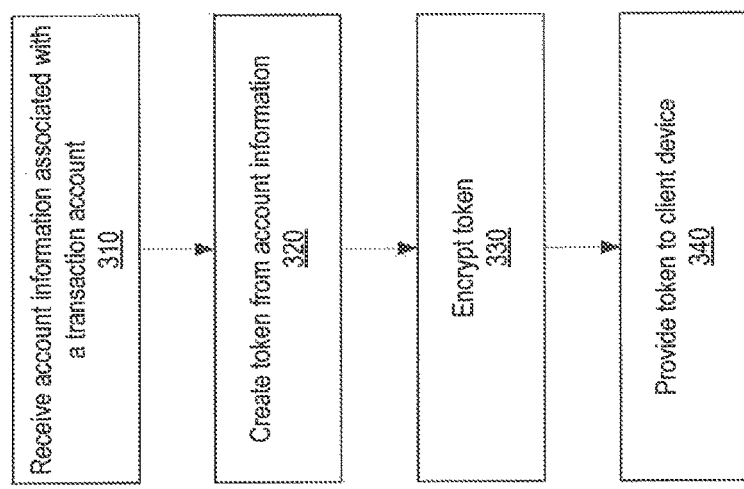
FIG. 3A is a flowchart of an exemplary process for providing a tokenized transaction account consistent with disclosed embodiments.

FIG. 3A shows a flowchart of an exemplary token generation process consistent with disclosed embodiments. In one aspect, vault 146 may be configured to generate, delete, modify, and/or replace tokens in accordance with the disclosed embodiments. In one aspect, vault 146 may execute software instructions that receive account information associated with a transaction account (step 310). In one aspect, vault 146 may receive the account information from server 142, data repository 144, client device 104, or payment network 130. The account information may be associated with a transaction account associated with user 110 and provided by system 140 and/or business entity 160. The account information may include information formatted in certain configurations depending on the type of transaction account. The transaction account may be configured as a numeric, alphabetic, alpha-numeric, or any other type of format representing a form of an account. The transaction account may be configured as certain size (e.g., certain number of bits, bytes, etc. of data) that may be in single-level or multiple-level configurations. In certain aspects, the transaction account may be configured according to a standard associated with the type of transactions associated with the transaction account (e.g., financial service account, user identification account (e.g., State DMV license identifications, employer or government issued configurations, etc.)).

Figure 3B:
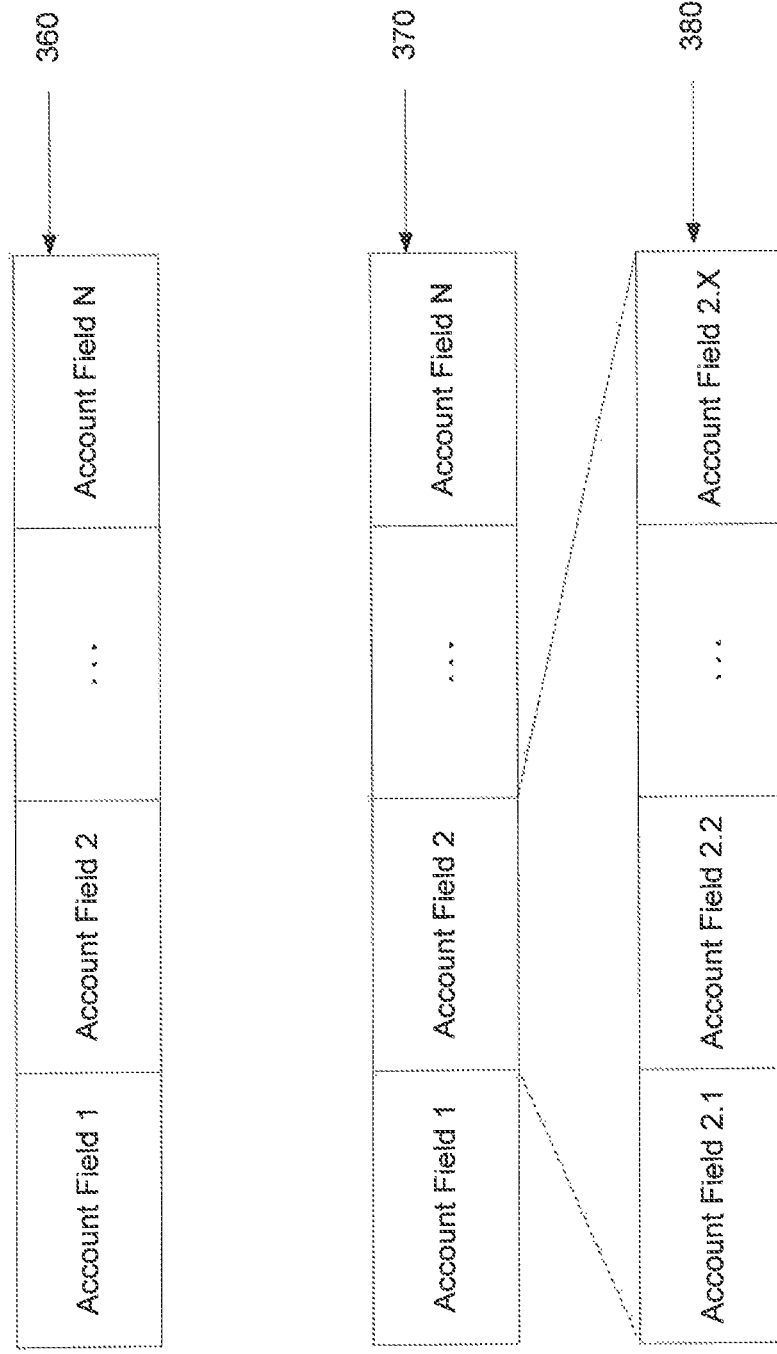
FIG. 3B is a block diagram of exemplary transaction accounts consistent with disclosed embodiments.

As an example, FIG. 3B shows block diagrams of exemplary transaction account configurations. As shown, a transaction account 360 may include a single-level configuration including N fields of data. Each field may include one or more items of data (e.g., bits, bytes, etc.). Transaction account 370 may be a multiple-level configuration including N fields of data, where one or more fields (or items of data in a field) includes another level of data (380) that may include a set of additional fields of data (e.g., X fields of data). In other embodiments, account level 380 may also include additional levels of data (not shown), and so on. The disclosed embodiments are not limited to the exemplary configurations of transaction accounts shown in FIG. 3B. Any number of configurations and formats of a transaction account may be implemented without departing from the scope of the disclosed embodiments.

Referring back to FIG. 3A, vault 146 may be configured to create a token from the account information associated with a transaction account (step 320). In one embodiment, vault 146 (or another computing device) may be configured to execute software instructions that perform a token generation process to create a token. In one aspect, vault 146 may collect a certain set of data from the transaction account to create the token. For example, vault 146 may select a certain number of items of data (e.g., bits, bytes, etc.) from certain portions of the transaction account and perform a tokenization process on that selected data to create a token.

For instance, referring to FIG. 3B, vault 146 may be configured to rotate data of a data field in a transaction account (e.g., field 2 or account 360) to create a random number from the data. In other aspects, vault 146 may take portions of data from different parts of transaction account 360, and combine them in a certain order or a random order to create a token. In other embodiments, vault 146 may take certain items of data (or combinations of items of data) from a second and/or one or more lower levels of a multiple level transaction account to create the token. For instance, vault 146 may select account field 2.2 from account level 380 and perform a rotation process (or other type of secure information generation process) to create a random representation of the data to create the token. In other aspects, vault 146 may select multiple portions of account data level 380, and combine, randomize, and/or rotate them (or perform another process) to create the token. In another example, vault 146 may select account field 1 and account field 2.2 (or portions thereof), and combine, randomize, and/or rotate the data to create a token.

The disclosed embodiments are not limited to which portions of a transaction account, or which level(s) of a transaction account, are selected to create a token. Nor are the disclosed embodiments limited to the type of secure information generation process performed on the selected data used to create the token. For example, vault 146 may rotate the selected data (e.g., take the last eight bits of data from a selected account field, rotated them in a fixed or random manner) to create a token. In another example, vault 146 may apply a mathematical function against the selected data to create a token (e.g., perform a logic operation on the selected data).

In certain embodiments, vault 146 may replace the transaction account data used to create the token with the token itself. For example, if actual account data (e.g., account field 2 of account 360 of FIG. 3B) was used to create a token, vault 146 may replace account field 2 with the token, which may represent a secure representation of account field 2. In another example, if vault 146 selected a portion of account field 1 and account field 2 of transaction account 360 to create the token, vault 146 may replace those portions of fields 1 and 2 with a secure representation of that data (e.g., rotate the data, such that one or more bits included in field 2 are placed in the one or more bits of field 1 that were used to create the token, and vice versa). In another embodiment, vault 146 may rotate a portion or all of account fields 1 and 2 in a selected way in accordance with a determined tokenization process (e.g., randomize the two fields using a known key function). The same or similar processes can be performed on other levels of the transaction account in a multiple-level transaction account (e.g., transaction account 370/380).

In certain embodiments, vault 146 may be configured to create the token such that certain data items of a transaction account are changed to a specified value or location. In certain aspects, the specified data and/or location in the transaction account may be created and stored in the account information to identify the transaction account as an account that has been tokenized. For example, vault 146 may create a tokenized transaction account such that a particular portion of an account field (or portions of other account fields or entire account fields) is set to a particular value, or sequence of values (e.g., number-alphanumeric, etc.). In certain aspects, payment network 130 may be notified by system 140 and/or business entity 160 of the particular value or sequence of values and particular portion of transaction accounts that are store those value(s) such that payment network 130 is able to detect a tokenized transaction account provided by system 140 and/or business entity 160. Further aspects of these embodiments are disclosed below in connection with FIG. 5.

Referring back to FIG. 3A, once the token is created, server 142 may (but is not required to) encrypt the token using known encryption processes and techniques to those skilled in the art (step 330). Server 142 may provide the token (which may or may not be encrypted) to client device 104 for storage (step 340). In other embodiments, server 142 may provide the token (which may or may not be encrypted) to another component of environment 100, such as, for example, payment network 130, merchant system 150, or another device (e.g., a server connected to communications network 160 (not shown)).

In certain aspects, client device 104 may be configured to execute software instructions to receive the token from server 142 and store the token in a memory device included in client device 104. In certain aspects, client device 104 may be configured to perform a transaction using the transaction account associated with user 110 and provided by system 140 and/or business entity 160. In one embodiment, client device 104 may be used to perform a transaction electronically by sending transaction account information (e.g., account 360, 370/380, etc.) to another device configured to receive, process, and confirm the transaction based on the transaction data (e.g., credit card account data provided to POS 156 during a mobile payment transaction). In one embodiment, when performing the transaction, client device 104 may provide the transaction account information stored on the client device 104 including the token generated by vault 146. For instance, client device 104 may provide the transaction account to POS 156 to facilitate a purchase transaction (e.g., credit card purchase using mobile payment techniques). The format of the transaction account may not be altered such that POS 156 recognizes the account as being in the standard form for financial service accounts accepted by POS 156. In turn, POS 156 may receive and send (directly, or through another computing device associated with merchant system 150 or with another system) the transaction account (including the token) to payment network 130 for authorization and confirmation. Payment network 130, or system 140, may provide, after processing the tokenized transaction account in accordance with the disclosed embodiments, confirmation and/or authorization for the account and perform and complete the purchase transaction.

Figure 4:
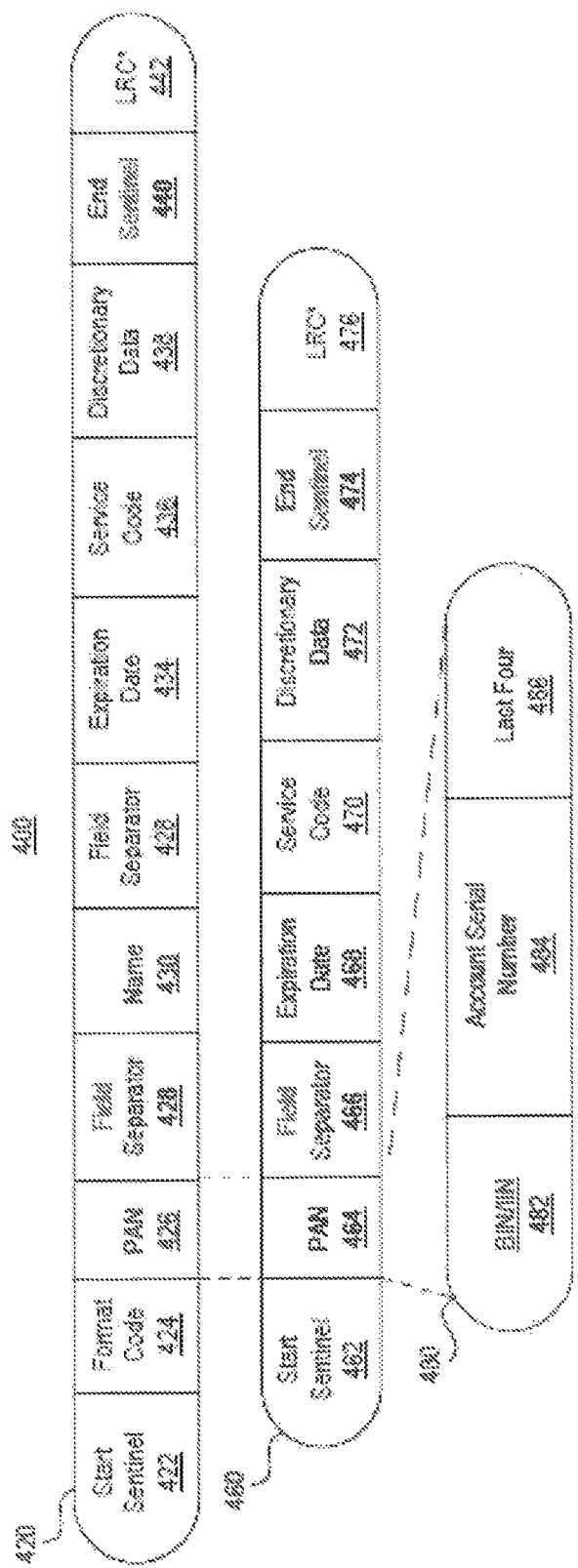
FIG. 4 depicts another exemplary transaction account consistent with disclosed embodiments.

As described, certain aspects of the disclosed embodiments may provide and manage tokens that are created from financial service accounts. FIG. 4 shows a block diagram of a financial service transaction account that may be used by the disclosed embodiments. In particular, FIG. 4 shows an exemplary representation of dynamic payment information (DPI) transaction account information 400 consistent with disclosed embodiments. DPI 400 may include Track 1 structured information 420 and Track 2 structured information 460. Both Track 1 information 420 and Track 2 information 460 may include fields 422-442 and 462-476, respectively, which may be standard data fields used by financial service entities for representing financial service accounts or for financial transactions, such as mobile wallet transactions. In one embodiment, DPI 400 may include the standard fields having standard data sizes (e.g., bit sizes, such as single bit, 8 bits, 25 bits, etc.) known to be implemented by financial service entities, such as a clearing house, etc. The data fields may include and be formatted in standard DPI configurations known to one skilled in the art for financial transactions, and may be read and recognized by, for example, point of sale devices (e.g., POS 156). In one aspect, certain fields of DPI 400 may include numeric values (e.g., primary account number (PAN) 480, expiration date field 434), and some may include alphanumeric values (e.g., name field 430, account issuer discretionary data 438).

In one embodiment, PAN field 426 may link to Track 2 structured information 460. For example, PAN 426 may be related to PAN field 464 of Track 2 information 460. The PAN 426 may have a primary account number for the financial account of user 110 that is provided by system 140 and/or business entity 160, in accordance with a data format scheme.

Consistent with the token processes disclosed herein, the disclosed embodiments may format certain fields of DPI 400 to allow system 140 to generate tokens to form a tokenized DPI 400. For example, in one embodiment, system 142 may configure PAN 424 of Track 2 to include a bank identification number (BIN) 482 identifying, for example, business entity 160. The disclosed embodiments may use the BIN as a way to route DPI 400 to certain components of environment 100, or devices of any of the components. In one example, BIN 482 may consist of six numeric data values, although the size and format may vary. PAN 464 may also include an account serial number 484 reflecting a portion of the financial service account associated with DPI 400. In one embodiment, system 142 may use account serial number 484 to store a secure representation of PAN 464 as a token. For instance, account serial number 484 may include a randomized, intertwined, or otherwise secure representation of a portion of certain data values (e.g., four to eight data values) taken from the primary account number for DPI 400.

Further, PAN 464 may include a last four field 486 reflecting the real last four digits of the primary account number for DPI 400.

In some embodiments, vault 146 may perform a one or more tokenization processes on one or more fields of DPI 400 to tokenize DPI 400 and correspondingly, may allow authentication of the transaction account to perform financial service transactions. The disclosed embodiments include methods and systems that may use any field, portion of a field, or combinations of a field or fields of Track 1 420 and/or Track 2 460 of DPI 400 to create a token and form a tokenized transaction account. For example, as mentioned above, system 142 may create a random numeric token by randomizing four to eight data values from PAN 464 of Track 2 464. In another example, system 142 may create a token by performing a process on any one of the fields of DPI 400. Thus, system 142 may configure the expiration date field 434 of Track 1 420 to create a random numeric value (or other secure representation format) of the expiration date. System 142 may, in another embodiment, use the expiration date field 468 of Track 2 460 to create the token. Alternatively, system 142 may configure and the issuer discretionary data field 438 (or 472) to create a random (or other secure representation format) numeric value as a token. In other embodiments, system 142 may create the token from a combination of data values in two or more fields of DPI 400. For example, system 142 may combine the random numeric value of account serial number 484 with a random numeric value of expiration data field 468 to create a tokenized DPI 400. Any combination of any number of fields of DPI 400 may be used to create a token and a tokenized DPI 400.

In certain aspects, system 140 (e.g., vault 146) may store the token created from the transaction account in memory (e.g., data repository 144 or a memory included with or used by vault 146). System 140 may also link the token to the transaction account associated with user 110 in memory (e.g., data repository 144 or a memory included with or used by vault 146). In addition, or alternatively, system 140 (e.g., vault 146) may store a key or similar information that may be used to decode the tokenized data in the tokenized transaction account. In certain aspects, the key may reflect a routine or logic that can undo, for example, the randomization of any of the data in the transaction account, which was used to create the tokenized version of the transaction account. The key may also include information identifying the data, data fields, portions of data fields, or otherwise the locations of the data in the transaction account used to create the tokenized transaction account (e.g., token location information). System 140 (e.g., vault 146) may store information reflecting the location information separate from the key, or it may be part of the key. System 140 (e.g., vault 146) may link the key (and the token location information) to the token and the transaction account for user 110 such that system 140 is able to use the key for decoding the tokenized transaction account when received by, for example, payment network 130. The decoded tokenized transaction account reflects the actual transaction account before tokenization, and can be used by server 142 to perform transaction processes consistent with the type of transaction and services provided by business entity 160 (e.g., perform financial service transactions for financial service transaction accounts, etc.).

Figure 5:
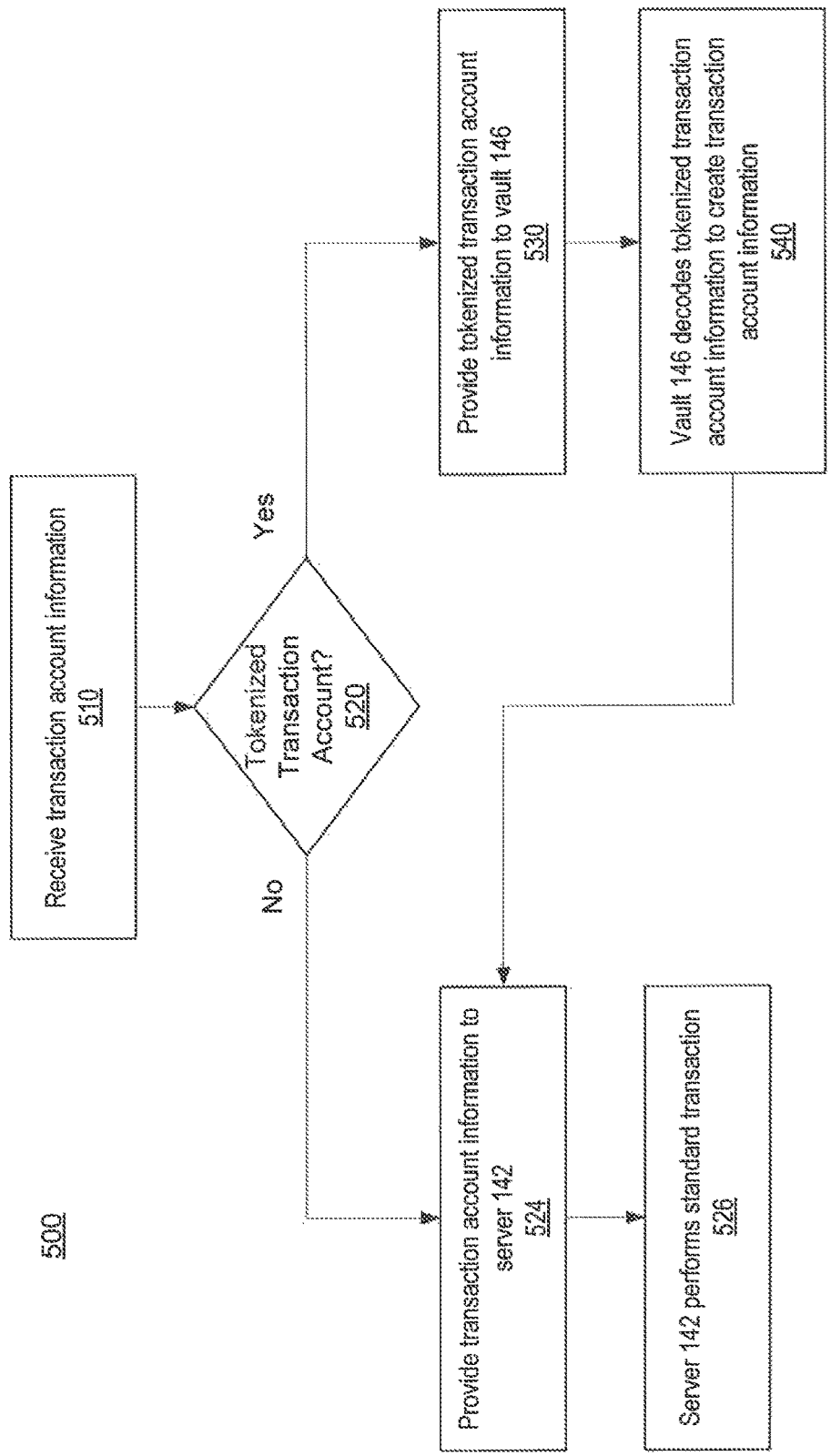
FIG. 5 is a flowchart of an exemplary process for processing tokenized transaction accounts consistent with disclosed embodiments.

FIG. 5 shows a flowchart of an exemplary transaction account process 500 consistent with certain embodiments. In one embodiment, certain steps of process 500 are disclosed as being performed by payment network 130. In other embodiments, the certain steps of process 500 may be performed by another computing system that is configured to receive transaction account information from merchant system 150 or other component of environment 100 (such as a different type of system 150).

In one embodiment, payment network 130 may receive transaction account information (step 510). For example, payment network 130 may receive a transaction account provided by merchant system 150 following a transaction performed by client device 104 and merchant system 150 (e.g., a mobile payment transaction between client device 104 and POS 156). Payment network 130 may execute software instructions that automatically determine whether the received transaction account is a tokenized transaction account in accordance with the disclosed embodiments (step 520). In one embodiment, payment network 130 may be configured to identify tokenized transaction accounts based on information provided by system 140 of business entity 160. For example, business entity 160 and the business entity associated with payment network 130 may establish an agreement where the types of transaction accounts tokenized by system 140 are known or identifiable by primary network 130. In one example, system 140 may provide to primary network 130 information that identifies tokenized transaction accounts created by system 140. Primary network 130 may use an identifier field in the transaction account along with the token identification information to determine whether a received transaction account is a tokenized transaction account. For instance, using DPI 400 as an example, system 140 may provide information identifying a certain data field (e.g., PAN account serial number 484), a portion of certain data fields (e.g., the first 4 digits of accounts serial number 484) tokenized by system 140 in a specific way.

For instance, when creating a token, system 140 may be configured to create a specified data value or values in a specified location of DPI 400 each time it creates the tokenized transaction account. In one example, system 140 may be configured to randomize certain digits of PAN 464, but create a predetermined set of data values of PAN 464 (e.g., first 2 or 4 digits (etc.) of account serial number 484, expiration date 468, etc.). System 140 may provide to primary network 130 the predetermined set of data values and the location of those values in DPI 400 as token identification information. Payment network 130 may be configured to execute software instructions that check the identified location and data values of a received transaction account to determine whether it matches the data values provided in the token identification information. If so, payment network 130 may determine that the received transaction account is a tokenized transaction account. The manner by which payment network is configured to recognize tokenized transaction accounts may vary and is not limited to the above examples.

System 140 may be configured to provide other ways of notifying payment network 130 to recognize a tokenized transaction account created by system 140. For example, system 140 may provide payment network 130 with a generated hash value that payment network 130 may use to decode certain predetermined data fields in a received transaction account to determine whether it is a tokenized transaction account. In such embodiments, system 140 may create a coded value of certain data in a transaction account different from the data used to create the token for the transaction account specifically used to flag the transaction account as a tokenized transaction account. Alternatively, system 140 may set data values in the tokenized transaction account to a certain value as a flag for payment network 130 (e.g., set issuer discretionary data 438 to a determined value) and inform payment network of the set value for that field as a flag of a tokenized transaction account.

Referring back to FIG. 5, if payment network 130 does not recognize the received transaction account as a tokenized account (step 520; No), it may provide the transaction account to server 142, bypassing vault 146 (step 524). For financial service transactions involving a financial service type payment network 130, this process may consist of known payment network processes for routing financial service accounts with an authorization request to the financial service account issuer (e.g., business entity 160) for authorization of the transaction account in a transaction. Server 142 may perform standard transaction processes in accordance with the type of transactions processed by business entity 160 (step 526). In one example, for financial service account type transactions, server 142 may perform known financial service account transaction processes for authorizing a purchase transaction performed by client device 104 with POS 156, such as authenticating the account, debiting the account the amount of the purchase transaction, and providing merchant system 150 with the authorization for completing the purchase transaction. In non-financial service account type transactions, server 142 may perform standard transaction processes in accordance with those types of transactions (e.g., authorizing entry, authorizing use of a product or thing (e.g., Zipcar™ use) etc.).

If, however, payment network 130 determines that the received transaction account is a tokenized account (e.g., step 520; Yes), it may provide the tokenized transaction account to vault 146, bypassing server 142 (step 530). In one example, payment network 130 may provide the tokenized transaction account with an authorization request for use of the transaction account in a transaction (e.g., the transaction involved with client device 110). Vault 146 may be configured to receive the tokenized transaction account information and perform a untokenization process to create the real transaction account used in connection with the transaction involving client device 104 (step 540). In one example, vault 146 may execute software instructions that automatically decode the tokenized transaction account information using the key or other token linking information stored by vault 146, as described above. For instance, vault 146 may use a stored key created when it generated the token for the tokenized transaction account, to decode the received tokenized transaction account from payment network 130 into the original transaction account. Once the original transaction account is created, vault 146 may provide the transaction account to server 142 for standard transaction processing (e.g., steps 524, 526). In other embodiments, when creating the tokenized transaction account, vault 146 may create a key that is common for all transaction accounts it creates for one or more users holding accounts provided by business entity 160. The key may be a global key that can be used to decode received tokenized transaction accounts associated with different users. For instance, the key may be a logic routine that is used to decode certain identified locations of the transaction account used to create tokens for the transaction accounts of the multiple users.

The disclosed embodiments include methods and systems to improve the security of transaction accounts through the dynamic update, replacement, or elimination of tokens for creating tokenized transaction accounts. Based on one or more conditions or rules, the disclosed embodiments may intelligently determine whether a tokenized transaction account has been compromised, or is in risk of being compromised, and automatically refresh or replace the tokenized account with an updated tokenized transaction account that is stored on client device 104.

In certain embodiments, vault 146 may be configured to execute software instructions (or a processor may execute software instructions stored as vault 146) to generate one or more token update conditions for a transaction account associated with user 110. For example, vault 146 may generate and store conditions controlling whether and/or how the user's token for a tokenized transaction account needs to be refreshed, replaced, or otherwise modified. The conditions dictating whether to update the token may be based on one or more characteristics, such as, for example: the user's usage pattern of the transaction account (e.g., frequency of use); demographics of the user; usage patterns relating to a group of users holding transaction accounts with business entity 160 (including user 110); location-based services (LBS) data reflecting where a transaction occurs relating to the transaction account (e.g., high-risk or low-risk designated geographical locations); the business location involved in the transaction or involved with one or more previous transactions associated with the transaction account (e.g., type of merchant, high- or low-risk merchants, etc.); the type of good or service involved in the transaction or one or more previous transactions associated with the transaction account (e.g., high-end or low-end priced products or services, vehicle rental or purchase, jewelry or home goods, liquor purchases, etc.).

In other embodiments, and in addition to generating and storing conditions triggering an update or a replacement of a previously generated token, vault 146 may be configured to modify or limit a functionality of an updated and/or replaced token in order to further improve the security of user 110's transaction accounts. By way of example, vault 146 may be configured to limit a functionality of an updated token linked to a credit card account to user 110 such that the updated token is usable for purchase transactions of limited value, of limited frequency, or involving limited types of goods and/or retailers. In other instances, and in response to potentially fraudulent transactions, vault 146 may be configured to replace a previously generated token with a "tracer" token that enables system 140 to trace locations of a device of user 119 (e.g., client device 104) and/or of attempted purchase transactions involving the user. In some aspects, the tracer token may function as a "dummy" token, such that a fraudulent user of the dummy token may believe transaction server 142 executed a purchase transaction involving the dummy token, when instead, transaction server 142 merely monitored the fraudulent user's location and actions without executing the purchase transaction. Further, in additional aspects, vault 140 may be configured to de-active and render inoperable a previously generated token of user 110.

The above examples are not limiting, and the disclosed embodiments may generate and use other types of condition characteristics to determine whether the token requires updating.

FIG. 6 shows a block diagram of an exemplary data structure 600 that may be created by vault 146 relating to one or more conditions for determining whether to update a token, consistent with certain disclosed embodiments. The format, types of information, and configuration shown in data structure 600 are exemplary, and the disclosed embodiments are not limited to the conditions, rules, and other information shown in FIG. 6. Other conditions, fewer conditions, rules, account information, risk level representation, etc. may be implemented by the disclosed embodiments.

As an example, vault 146 may generate and store one or more of the exemplary conditions (e.g., conditions 1-7) to apply to one or more user accounts (e.g., user 1, 2, and 3 transaction accounts). Risk levels (e.g., high, medium, low) may be assigned to each transaction account in relation to the conditions. In certain embodiments, vault 146 may execute software instructions that automatically generate and link one or more conditions to a user transaction account. In other embodiments, a user associated with business entity 160 (e.g., user 110) may program and store one or more conditions for linking to a user transaction account. As shown, data structure 600 may include conditions that may be analyzed by vault 146 when determining whether to update a token for a respective user transaction account.

In one embodiment, condition 1 may be an exemplary condition relating to the frequency of use for a user account over a specified period of time (e.g., hours, days, week, weeks, month(s), etc.). Vault 146 may collect the usage pattern of a user transaction account from data structure 144, or may request the information from server 142. Depending on the frequency of use, vault 146 may assign risk level (e.g., high, medium, low, etc.) to the transaction account, which may trigger vault 146 to update the token for the transaction account. For example, vault 146 may configure condition 1 such that it checks to see if the frequency of use meets a determined threshold, and if not, triggers the update of the token. For instance, user 1 may use their account more frequently than other users (e.g., more than 5 times a week), and thus vault 146 may determine that no trigger should be set to update user 1's transaction account no. 1. In the exemplary structure 600 of FIG. 6, the risk level may be assigned "Low" to reflect that the security risk for the tokenized transaction account is low, according to one or more parameters set by vault 146 or business entity 160. On the other hand, user 1 may not use his/hers second account (account 2) frequently, and thus condition 1 may trigger that the token for user 1's second account should be updated (e.g., security risk is "High" based on, for example, once a week use). Vault 146 may determine a periodic update for any user account that fails to meet the threshold for condition 1. For example, for accounts used sparingly (e.g., used at low frequencies), vault 146 may determine that the identified account should have its token updated every day, every three days, every week, or any other specified period of time.

As another example, condition 2 may be associated with a risk level based on the user's profile information, such as demographic information (e.g., income, employment status, family status, age, etc.). Thus, for example, if user 1 is a teenager, vault 146 may, based on condition 2, trigger a periodic or dynamic update of the token for user 1's transaction account or accounts. Condition 3 may be associated with the risk level relating to the location involved with a current transaction that is being analyzed by vault 146. For example, vault 146 may receive a tokenized transaction account from payment network 130 for a current transaction involving user 1's transaction account 1. The transaction information may include a location identifier identifying the merchant location involved with the transaction. In other embodiments, vault 146 may collect geographic information relating to the location of client device 104 that is involved with the transaction, and that provided the transaction account to the merchant for the transaction. Vault 146 may have access to a stored relationship map between identity or account theft locations and certain geographic locations to identify high, medium and/or low risk geographic locations regarding account transactions. In other aspects, vault 146 may obtain information identifying occurrence of account theft, fraudulent, and/or criminal activity from a third-party system or data repository (e.g., a law-enforcement agency or a governmental entity), and may identify the high-, medium-and/or low-risk geographic locations regarding account transactions based on the obtained information.

If vault 146 determines that the current transaction is taking place in a high-risk location, it may trigger the update of the token for the user's transaction account involved in the transaction (e.g., user 1's transaction account 1). Vault 146 may be configured to dynamically update the token upon detection of this condition (or others) or it may trigger the periodic token update of the transaction account (e.g., update the token within the next 1 to D transactions, or within the next period of time (e.g., hour, day, week), etc.). In other aspects, and as noted above, if vault 146 determines that the current transaction is taking place in a high-risk location, vault 146 may be configured to modify a functionality of the token during an update process to reduce a risk of potential future fraudulent activity. For instance, the updated token may be functional for purchase transactions having values below a predetermined threshold, for only a predetermined number of purchase transactions within a specified time period (e.g., an hour, a day, etc.), or for purchase transactions involving a limited number of goods and services (e.g., bread, but not electronics or alcohol).

Condition 4 may be related to a risk level associated with a pattern of previous locations that a user transaction account was used. For example, vault 146 may determine to trigger the dynamic or periodic update of the token for the transaction account if a history of transactions for the account shows transactions involving high-risk locations (e.g., similar to the locations determined for condition 3). Condition 5 may be associated with a risk level for the type of product or service involved in a current transaction. For example, vault 146 may be configured to determine whether a product or service involved in a current transaction using a user's transaction account is a high-risk type of product or service, and if so, trigger the dynamic or periodic update of the token. For instance, vault 146 may determine through the transaction information provided by payment network 130 (or merchant system 150) that the type of product attempted to be purchased is alcohol (e.g., SKU or product identifier information, etc.). Vault 146 may compare the type of product with a stored mapping between product/service types that may be associated with high- or low-risk transaction (e.g., alcohol transaction may be designated as high-risk), and determine based on the comparison whether to trigger the dynamic or periodic update of the token for the transaction account. Condition 6 may be associated with a risk level corresponding to the business entity involved with a current transaction. For example, vault 146 may determine that a current transaction involves a high-risk merchant or business entity (e.g., liquor store, firearm retailer, etc.) and thus trigger the dynamic or periodic update of the token for the account used during the transaction. Vault 146 may access a stored mapping between merchant types and risk levels to assess whether the current transaction involves a high-risk merchant. Similarly, condition 7 may be associated with the risk level of business entities involved in one or more previous transactions with the user's transaction account. Vault 146 may access stored historical data regarding previous transactions involving the transaction account to identify the types of merchants that conducted the transaction with the account. If a certain number of those transactions involved a certain number of high-risk business entities, vault 146 may trigger the dynamic or periodic update of the token for the corresponding transaction account.

As noted above, the exemplary conditions and rules, thresholds, and corresponding characteristics of those conditions may vary. The disclosed embodiments may implement other types of conditions to determine whether a token for a transaction account should be updated.

Further, in some embodiments, vault 146 may be configured to adaptively modify rules, thresholds, and/or characteristics of a condition previously applied to a token or tokenized transaction account of user 110. For instance, through the adaptive modification of the rules, thresholds, and/or characteristics, vault 146 may delay, or alternatively, accelerate, an established update to one or more of user 110's tokens or tokenized transaction accounts. Further, and in addition to the delay or the acceleration of established updates, vault 146 may also modify a format, an ordering, or an amount of transaction account data required to generate the updated token or tokenized transaction account, as described above.

For instance, based on data indicative of user 110's prior purchase transactions (e.g., as stored in transaction data 144C), vault 146 may establish that a credit card held by user 110 is sparingly used in purchase transactions having values greater than $100. Vault 146 may, in some instances, apply a condition to user 110's credit card account requiring an update of a token associated with user 110's credit card account after each purchase transaction (e.g., via POS 156, through a peer-to-peer transaction, or upon detection of a device of a proximity system (e.g., an iBeacon™ device)) having a value in excess of $100.

In some aspects, however, user 110 may use the credit card account token in multiple successive purchases that exceed $100. For instance, user 110 may plan to spend a day at a mall to complete holiday shopping for his or her family, and may use the credit card account token to purchase gifts in excess of $100 from multiple retailers disposed within the mall. The requisite regular update of user 110's credit card account token, which vault 146 performs after each $100 transaction, may interrupt user 110's shopping experience and discourage user 110 from purchasing additional gifts from retailers at the mall.

In other embodiments, vault 146 may determine a "level of confidence" on user 110's credit card account token based on, for example, third-party data indicative of user 110's daily activities, and may delay the requisite regular update of user 110's credit card account token to improve user 110's shopping experience. For example, a device of user 110 (e.g., client device 104) may store user 110's credit card account token, and in response to a request from user 110, may generate commands that transmit the credit card account token to point-of-sale (POS) devices disposed at merchants throughout the mall. In some aspects, client device 102 may include a global position system (e.g., a GPS) that tracks user 110's position and may transmit location-based data to a third-party system (e.g., a mobile telecommunications provider) or may append positional data to data transmitted to system 140 (e.g., in response to a completed transaction or a required update).

Vault 146 may, for example, obtain the location-based data associated with user 110, and process the location-based data to correlate user 110's location with the locations of the POS devices associated with the purchase transactions. In some aspects, the correlation between the locations of user 110 and the purchase transactions may enable vault 110 to confirm that user 110 authorized the purchase transactions and to increase a "level of confidence" in user 110's credit card token sufficient to delay the required update until after user 110 finishes the day's shopping. For instance, vault 146 may delay an update of user 110's credit card account token for a predetermined time period (e.g., twelve hours), until a next calendar day, or by any additional or alternate time sufficient to enable user 110 to complete the planned shopping trip.

The disclosed embodiments are not limited to techniques that determine whether to update or replace a previously generated token based on location-based data. In further aspects, vault 146 may confirm that user 110 authorized or participated in a purchase transaction based on data obtained from one or more social networking sites (e.g., through an API associated with a server or computer system supporting a social network of user 110). For example, vault 146 may obtain social networking data that establishes that user 110 visited (e.g., "checked-in") to retailers and merchants associated with the purchase transactions involving user 110's credit card account token. In other instances, vault 146 may establish the level of confidence in user 110's credit card account token based on any additional or alternate source of third-party data accessible to system 140 over network 120 and capable of verifying user 110's proximity to or authorization of the purchase transactions.

In further embodiments, vault 146 may execute software instructions that accelerate the regular update of user 110's credit card account token and modify one more of the rules, thresholds, and conditions associated with the credit card account token in a manner that improves user 110's shopping experience. For example, when updating user 110's credit card account token, vault 146 may increase a threshold value of an individual purchase that would trigger a subsequent update (e.g., increase the threshold value from $100 to $500), establish a trigger for subsequent updates based on a threshold amount of aggregate purchases over a period of time (e.g., trigger a token update when an aggregate amount of purchases in a one-hour period exceeds $1000), or establish a shorter transaction "cool down" (e.g., trigger an update every third, fifth, or tenth transaction). The disclosed embodiments are not limited to such exemplary modifications, and in further embodiments, vault 146 may establish any additional or alternate triggering event or condition that improves user 110's shopping experience, maintains a level of security mandated by an issuer of the credit card or financial instrument, and is consistent with user 110's purchase transaction patterns.

Further, in other aspects, vault 146 may be configured to modify or adaptively modify rules, thresholds, and/or characteristics of a previously applied condition based one or more security characteristics of a POS terminal facilitating a purchase transaction (e.g., POS 156), a peer-to-peer purchase transaction (e.g., device-to-device), and/or a purchase transaction facilitated by a device of a proximity system (e.g., an iBeacon™ device). For example, vault 146 may obtain information identifying a type and/or strength of an encryption technique applied by POS 156 to data received a token received from client device 104 and transmitted to system 140, and further, may identify an expected strength of data encryption associated with communications between POS 156 and system 140 (e.g., a standardized or threshold data encryption strength). Based on the obtained information, vault 146 may, for instance, delay a scheduled update to user 110's token (e.g., when POS 156's data encryption strength exceeds the expected or threshold strength), or alternatively, vault 146 may accelerate the scheduled update to user 110's token (e.g., when POS 156's data encryption strength falls below the expected or threshold strength). Further, in some instances, and based on the obtained information, vault 156 may increase or decrease a threshold purchase amount triggering the scheduled update, a transaction cool-down associate with the token, and any additional or alternate parameter appropriate to the token and vault 146.

In additional aspects, vault 146 may establish conditions that update a token of user 110 and/or modify a functionality of the token in response to potential fraudulent activity. For example, system 140 may, based on a pattern of user 110's prior purchase transactions (e.g., as stored within transaction data 144C), system 140 may determine that recent purchase transactions involving a credit card account of user 110 represent potentially fraudulent activity. In other aspects, user 110 may report the potentially fraudulent activity to a financial institution associated with system 140 (e.g., after inspecting a monthly statement of the credit card account), and additionally or alternatively, may report a loss or theft of a mobile device that stored a token linked to the credit card account.

In certain instances, and in response to the potentially fraudulent activity, vault 140 may override one or more established token update conditions (e.g., Conditions 1-7 of FIG. 6), and additionally or alternatively, may be configured to render the credit card account token unusable for purchase transactions. Additionally or alternatively, vault 146 may be configured to initiate an update and/or replacement of the credit card account token in response to the potentially fraudulent activity, and further, may limit a functionality of the updated and/or replaced token to reduce a risk of additional fraudulent activity. For example, the limited-functionality token may be usable for purchase transactions having values below a predetermined threshold, for only a predetermined number of purchase transactions within a specified time period (e.g., an hour, a day, etc.), or for purchase transactions involving a limited number of goods and services (e.g., a purchase of bread, but not electronics or alcohol).

In other instances, and in response to the potentially fraudulent activity, vault 146 may be configured to replace a compromised token on a device of user 110 (e.g., client device 104) with a "tracer" token. System 140 may, for example, be configured to track locations of attempted purchase transactions involving the tracer token and to monitor the position of client device 104 (which stores the tracer token) within a geographic region.

In further embodiments, vault 146 may be configured to perform a pre-purchase update or replacement a previously generated token. For instance, user 110 may initiate a purchase transaction involving a good or service at a retailer using a previously generated token (e.g., linked to a credit card account of user 110). The purchase transaction may, by way of example, include a purchase transaction at a POS terminal or a merchant (e.g., POS 156), a peer-to-peer purchase transaction (e.g., device-to-device transaction), and/or a purchase transaction facilitated by a device of a proximity system (e.g., an iBeacon™ device). In some aspects, if the cost of an individual good or service exceeds a first threshold value (e.g., a cost of a single good or service exceeds $100), and/or an aggregate cost of all goods and services exceeds a second threshold value (e.g., a total cost of all goods and services exceeds $500), vault 146 may be configured to update and/or replace the credit card account token, and to deliver (e.g., push) the updated or replaced credit card account token to a device of the user (e.g., client device 104) and/or a counterpart device (e.g., POS 156) to complete the purchase transaction.

In additional aspects, vault 146 may be configured to update, replace, and/or modify a functionality of tokenized transaction accounts based on one or more user-specified rules. For example, user 110 may be especially conscious of a potential for fraudulent activity associated with electronic payment processes. In some instances, user 110 may establish, through a digital portal of the financial institution (e.g., a web page or graphical user interface (GUI) of a mobile application), a rule requiring that vault 146 refresh a token associated with user 110's credit card every twelve hours, after every five transactions, or in response to any additional or alternate user-specified condition appropriate to the credit card account token and to vault 146. Further, in some aspects, vault 146 may refresh or replace the credit card account token in accordance with the user-specified rules regardless of the status of the credit card account token with respect to the conditions outlined above.

Vault 146 may also implement other types of conditions that control how the token is generated. For instance, upon detection of a signal from a device associated with a proximity system (e.g., an iBeacon™ device), a device of user 110 (e.g., client device 104) may transmit a signal to system 140, which may serve as a trigger to update and/or replace a previously generated token. Further, in some instances, the signal of generated proximity system device may include additional information that upon receipt by vault 146 via client device 104, may enable vault 146 to selectively and adaptively modify one or more rules, thresholds, and/or characteristics of a previously applied condition, as described above. For example, the signal may include information identifying a geographic location of the proximity system device or identify a retailer associated with the geographic proximity device.

Further, in some instances, vault 146 may apply one or more rules that, based on whether a high-risk condition exists, may adjust what data fields, portions of data fields, the logic and routines used to code the data, etc., to create the token for a user's transaction account. For instance, vault 146 may determine to trigger a token update, and/or change how the token is generated and represented in the tokenized transaction account, based on, for example, whether a certain number of the exemplary conditions (e.g., conditions 1-7) are met. Higher-risk transaction accounts may require more robust coding for tokens (e.g., use PAN data from Track 2 and expiration date data from Track 1 of DPI 400 to create a token), whereas lower risk transaction accounts may require less complex coding techniques (e.g., only use PAN data to create a token).

Figure 7:
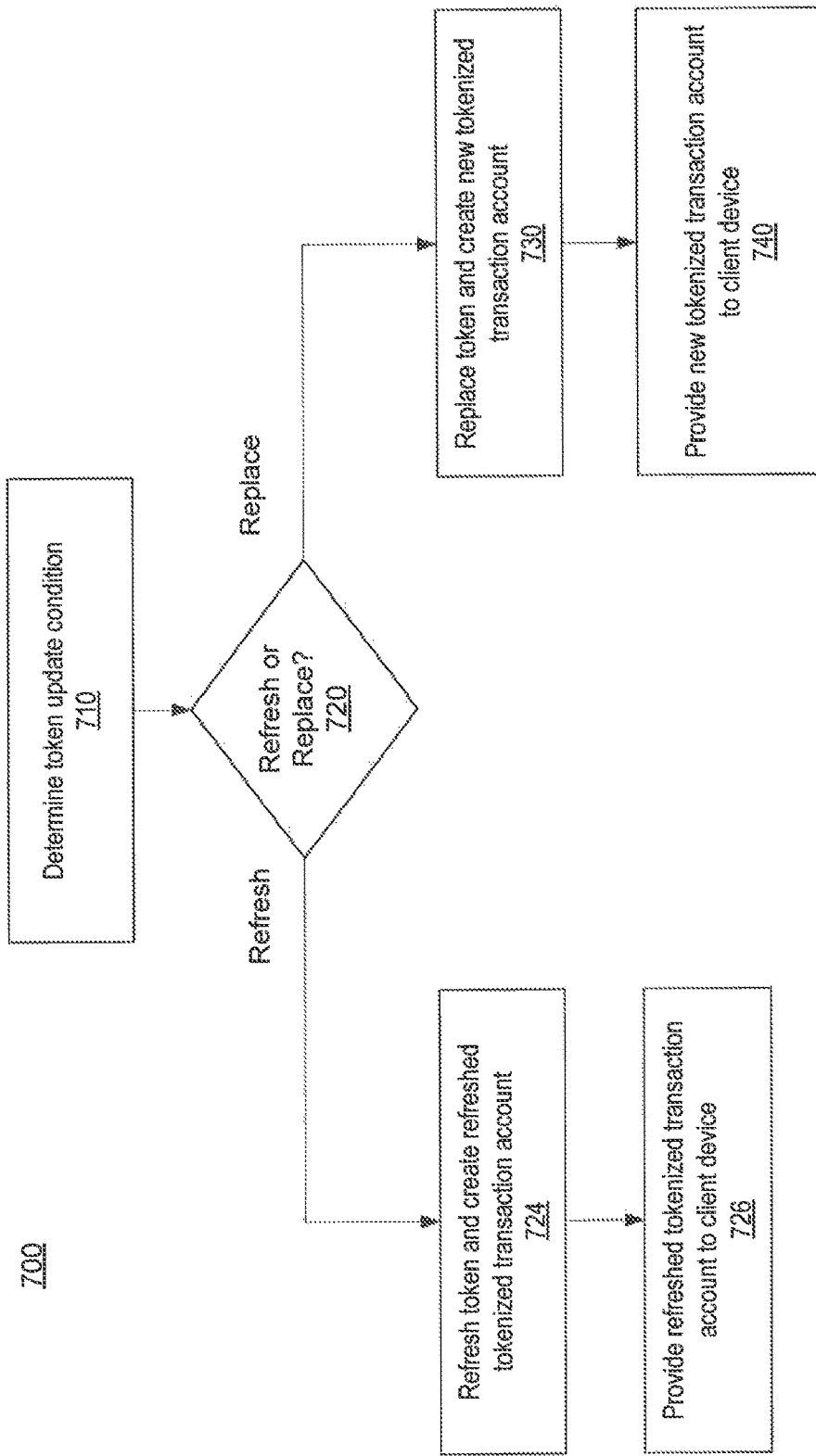
FIG. 7 is a flowchart of an exemplary tokenized transaction account update process consistent with disclosed embodiments.

FIG. 7 shows a flowchart of a token update process 700 consistent with certain embodiments. In one embodiment, vault 146 may perform one or more steps of process 700 in accordance with the disclosed embodiments. In one aspect, vault 146 may execute software instructions that perform a token update condition checking process to determine whether an update condition exists regarding the token for a user's transaction account (step 710). For example, vault 146 may analyze the user's transaction account against one or more conditions, such as the exemplary conditions described above in connection with FIG. 6. Based on the analysis, vault 146 may determine whether to update the token for the user transaction account (step 720). In one example, vault 146 may determine whether it is appropriate to refresh the token or replace the token entirely. In one embodiment, refreshing a token may involve reprocessing the same data fields used previously to create the token (e.g., re-randomizing certain data values in the PAN account serial number field 484 of DPI 400 of FIG. 4). If a refresh condition exists (e.g., step 720; Refresh), vault 146 may refresh the token in accordance with the conditions or rules configured with vault 146 to create a refreshed tokenized transaction account (step 724). Vault 146 may provide the refreshed tokenized transaction account to client device 104 for storage by the device, and subsequent use during later transactions, consistent with the disclosed embodiments (step 726). As noted above, vault 146 may determine to refresh a token dynamically or periodically based one or more conditions.

However, if vault 146 determines it is appropriate to replace the token (e.g., step 720; Replace), vault 146 may execute software instructions to perform a token replacement process that replaces the token and creates a new tokenized transaction account, which may be based on one or more conditions that control how the new token is generated (step 730). For example, vault 146 may determine, based on one or more conditions assessed by vault 146 relating to the transaction account signal, that the transaction account may be at risk. In such an instance, vault 146 may perform a process to replace the token using, for example, a different token generation scheme (e.g., use different fields, portions of data fields, combinations of data or data fields, etc.). Vault 146 may be configured to create new key information for the replacement token, and provide the necessary information to payment network 130 to ensure it is able to detect when it receives a tokenized transaction account from merchant system 150. Vault 146 may provide the new tokenized transaction account to client device 104 for storage and subsequent use during later transactions, consistent with the disclosed embodiments (step 740). As noted above, vault 146 may determine to replace a token dynamically or periodically based one or more conditions.

As explained, the disclosed embodiments provide methods and systems that intelligently determine when and how to update a token for a transaction account. While examples disclosed herein involved financial service transaction accounts and financial service transactions, the disclosed embodiments may perform one or more of the disclosed processes for other types of transaction accounts and transactions. In some instances, payment network 130 may not be involved. For example, the system that receives the transaction account from client device 104 may be configured to perform operations similar to those disclosed herein for payment network 130 (e.g., determining whether the transaction account is a tokenized transaction account, and forwarding the account to system 150 for appropriate processing, such as described in FIG. 5). For example, business entity 160 may be a hotel and the transaction account may be associated with user 110's hotel registration information. In certain aspects, system 140 associated with the hotel may generate a tokenized transaction account for the user's registration and access information such that client device 104 may be used to gain access to the user's assigned hotel room (e.g., electronic access device). In this example, the entrance to the hotel room may include a reader device that is configured to receive the transaction account information from client device 104 (which may be an electronic wallet, mobile device, electronic smart card, etc.) to gain access to the room. The reader device may be configured to receive and forward the received account information to a computing system that determines whether the received account is a tokenized account (similar to that performed in FIG. 5). If so, the computing system may send the tokenized account to vault 146, consistent with the above-disclosed embodiments. Otherwise, it may send the transaction account to server 142 for standard transaction processing (e.g., continue to allow access, use hotel amenities, etc.) Similar processes may be implemented in other environments, such as a vehicle rental or borrowing scenario (e.g., Zipcar™, etc.) For instance, a transaction account reader device may be positioned on a vehicle available to many users who have transaction accounts that manage and provide the vehicle for use. The reader device may include processing components that forward the transaction account information to a computing system that determines whether the account is a tokenized account for routing in accordance with the disclosed embodiments above (e.g., like those of FIG. 5).

As another example, business entity 160 may be associated with a travel services entity providing security access check accounts that may be screened at airports or other travel provider locations. The same principles and processes disclosed above may be implemented in these embodiments, where client device 104 may provide the transaction account reflecting the travel account for user 110. Vault 146 may determine based on one or more conditions associated with the travel transaction account to determine whether the tokenized transaction account needs to be refreshed or replaced, and performs processes similar to those disclosed above to do so.

In certain embodiments, system 150 or a reader device provides received transaction account information to a computing system to assess whether the account is a tokenized account (e.g., payment network 130). In further embodiments, system 150 may be configured with processors and/or computing system(s) that directly receive the transaction account from system 150 (or reader device, etc.) to make that determination and route the transaction account to vault 146 or server 142.

In other embodiments, the token may be associated with particular device, such as POS 156, a client device involved in a prior peer-to-peer transaction, and/or a device associated with a proximity system (e.g., an iBeacon™ device). For instance, POS 156 may have an associated identification code that may be tokenized using similar concepts and techniques disclosed here regarding tokenizing transaction accounts. In one example, vault 146 (or another computing device or executed software) may determine whether one or more conditions exist that trigger the update of the token for the POS identification code, such as for example, based on the profile of a worker who signs into use POS 156. For instance, certain workers may be considered higher security risks for using POS 156 (e.g., new employees, employees with criminal records, etc.), and thus the disclosed embodiments may generate and analyze condition(s) that determine whether to trigger the refreshing or replacement of the token for the POS identification code.

The methods and processes of the disclosed embodiments are not limited to any particular sequence or require the particular steps that are shown in the figures, or limited to the systems or components that perform those steps or processes. Further, the disclosed embodiments are not limited to purchase transactions between a device of user 110 (e.g., client device 104) and POS 156, and in further embodiments, purchase transactions consistent with the disclosed embodiments may involve, without limitation, peer-to-peer transactions involving direct communications between client device 104 and devices of other users (e.g., through NFC or Bluetooth communications), and transactions involving and/or initiated by a device of a proximity system (e.g., an iBeacon™ device). Nor are the disclosed embodiments limited to any configuration of the systems or components disclosed herein or shown in the figures.

Figure 8:
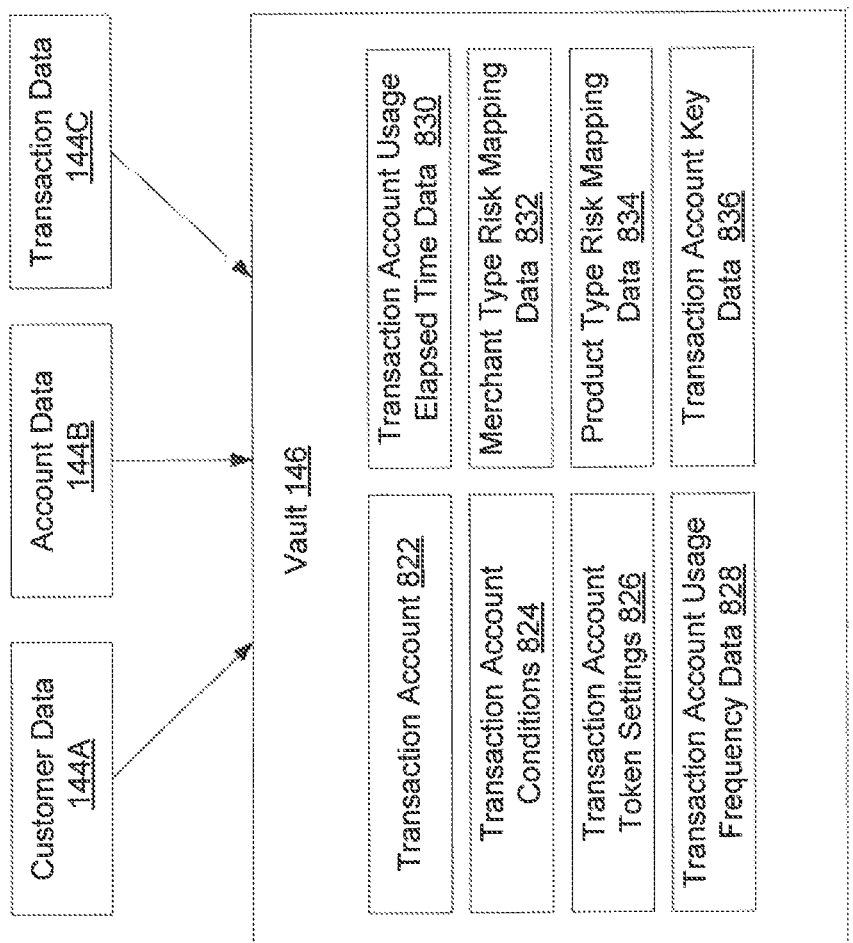
FIG. 8 depicts an exemplary vault environment consistent with disclosed embodiments.

For example, FIG. 8 shows a block diagram of an exemplary vault 146, consistent with certain disclosed embodiments. In one example, as disclosed above, vault 146 may be a computing system including one or more processors and one or more memories that store data and software instructions executed by the one or more processors to perform processes consistent with certain disclosed embodiments. In one example, vault 146 may generate and update a token for a transaction account (e.g., 822) by analyzing data associated with the user holding the transaction account (e.g., 110). For example, transaction account 822 may be data associated with the account (e.g., 360, 370/380, 400, etc.).

Vault 146 may generate and analyze one or more transaction account conditions 824, such as the exemplary conditions discussed herein including those described in connection with FIG. 6. Vault 146 may also consider transaction account token settings 826, which may include information that controls how a token is created for a transaction account 822, such as rules governing the specified data, data fields, combination of data or data fields, etc. included in transaction account and used to create the token. Vault 146 may also consider transaction account usage frequency data 828 in relation to the conditions 826. Transaction account usage frequency data may include information that reflects current and historical usage information relating to the transaction account 822 (e.g., patterns or summary of usage of the transaction account at locations, for certain products or services, etc.). Similarly, vault 146 may analyze transaction account usage elapsed time data 830, which may include information reflecting when the transaction account was last used or a time stamp history of past uses over a period of time, etc. Vault 146 may also consider merchant type risk mapping data 832 in connection with the transaction account conditions 824. Merchant type risk mapping data 832 may include information reflecting relationships between merchants (e.g., name of merchants) and/or merchant types (e.g., sporting goods, grocery store, liquor store, etc.) and risk levels associated with the merchants and/or merchant types, similar to that disclosed above in connection FIG. 6. Vault 146 may also consider product type risk mapping data 834 in connection with transaction account conditions 824. Product type risk mapping data 834 may include information reflecting relationships between products (e.g., product identifiers, names, SKUs, etc.) and/or product types (e.g., sporting goods, food items, liquor, etc.) and risk levels associated with the products and/or product types, similar to that disclosed above in connection FIG. 6.

Vault 146 may also consider and/or store transaction account key data 834, which may include the tokenized transaction account and information to help generate the token and decode the tokenized transaction account, as well as logic, functions, routines, and the like that are used to generate the token (e.g., functions to randomize the data in the transaction account to generate the token). Other information may be stored and/or used by vault 146 to perform the tokenization processes consistent with the disclosed embodiments. Further, although exemplary vault 146 shown in FIG. 8 shows a single transaction account 822, and associated information (e.g., 824-836), vault 146 may store and/or use such information associated with a number of different transaction accounts that may be associated with the same user (e.g., user 110) or one or more other users.

In the embodiments described above, reference is made to purchase transactions involving a point-of-sale (POS) terminal (e.g., POS 156) that corresponds a physical device in communication with a corresponding network. The disclosed embodiments are not limited to such physical POS devices, and in further embodiments, the POS terminals may a include "virtual" POS terminal that corresponds to a software modules executed by, among other things, merchant server 152 and client devices 104 in FIG. 1. Further, in additional embodiments, POS 156 may represent a device communicatively coupled to client device 104 and any additional or alternate client devices (e.g., a Square™) to provide mobile point-of-sale and payment services.

Further, in some instances, purchase transactions consistent with the disclosed embodiments may not involve a physical POS terminal (e.g., POS 156) or a virtual POS terminal. For example, user 110 may initiate a peer-to-peer purchase transaction between client device 104 and a client device of another user through, for example, a NFC connection, a Bluetooth connection, a WiFi connection, or any additional or alternate connection between devices capable of supporting the peer-to-peer purchase transaction. In other instances, a proximity system of a retailer (e.g., including an iBeacon™ device) may facilitate point-of-sale transactions involving a token stored on a compatible device of user 110 (e.g., client device 104). For example, client device 104 may be configured to execute an application that, upon detection of a signal of from an iBeacon™ device, initiates a purchase transaction of a good or service using a credit card account token of user 110 stored on client device 104.

Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A system, comprising:
   a communications interface;
   at least one processor coupled to the communications interface;
   a memory having computer executable instructions stored thereon, that when executed by the at least one processor, causes the at least one processor to perform the steps of:
   generating and storing a first update condition for determining whether to update a first tokenized transaction account at a client device;
   providing the first tokenized transaction account to the client device, the first tokenized transaction account constituting a secure digital representation of a transaction account;
   obtaining pending purchase transaction data involving a transaction account, the pending purchase transaction data including the first tokenized transaction account;
   in response to obtaining the pending purchase transaction data, determining that the first update condition applies to the pending purchase transaction data;
   determining that an update to the first tokenized transaction account is required based on the determination that the first update condition applies to the pending purchase transaction data;
   based on the determination that the update to the first tokenized transaction account is required, obtaining first location data of prior geographic positions of the client device and second location data of geographic positions of terminal devices that processed prior purchase transactions involving the transaction account;

determining that a subset of the prior geographic positions of the client device matches the geographic positions of the terminal devices;

based on the determination that the subset matches the geographic positions of the terminal devices, delaying the required update of the first tokenized account for a predetermined time period;

detecting that the predetermined time period has expired; and in response to the detection that the predetermined time period has expired, performing an update to the first tokenized transaction account and providing the updated first tokenized transaction account to the client device.

2. The system of claim 1, wherein the first update condition establishes a limit on a value of a pending purchase transaction.

3. The system of claim 2, wherein:

the pending purchase transaction data identifies products involved in the pending purchase transaction; and the first update condition establishes: a first limit on a cost of a corresponding one of the products; or a second limit on an aggregate cost of the products.

4. The system of claim 3, wherein the executable instructions, when executed by the at least one processor, causes the at least one processor to further perform the steps of:

associating the first tokenized transaction account with a first purchase functionality;

modifying the first purchase functionality in accordance with the first update condition;

establishing a second purchase functionality based on the modified first purchase functionality; and associating the updated first tokenized transaction account with the second purchase functionality.

5. The system of claim 1, wherein the pending purchase transaction data comprises the prior purchase transactions involving the transaction account; and the executable instructions, when executed by the at least one processor, causes the at least one processor to further perform the steps of:

associating the first tokenized transaction account with a first purchase functionality;

determining, based on the pending purchase transaction data, an average value of the prior purchase transactions or a frequency of the prior purchase transactions;

establishing a second purchase functionality in accordance with the average value or frequency; and associating the updated first tokenized transaction account with the second purchase functionality.

6. The system of claim 1, wherein the executable instructions, when executed by the at least one processor, causes the at least one processor to further perform the steps of:

identifying an instance of potential fraudulent activity involving the transaction account; and generating the updated first tokenized transaction account in response to the identified instance of potential fraudulent activity.

7. The system of claim 1, wherein the pending purchase transaction data identifies the prior purchase transactions involving the transaction account; and the executable instructions, when executed by the at least one processor, causes the at least one processor to further perform the step of:

delaying the update of the first tokenized transaction account for the predetermined time period.

8. The system of claim 1, wherein the executable instructions, when executed by the at least one processor, causes the at least one processor to further perform the steps of:

refreshing the first tokenized transaction account.

9. The system of claim 1, wherein the executable instructions, when executed by the at least one processor, causes the at least one processor to further perform the steps of:

based on the pending purchase transaction data, determining that a second update condition applies to the pending purchase transaction data;

generating second tokenized transaction account from account data elements of the transaction account in response to the determination that the first and second update conditions apply to the pending purchase transaction data; and providing the second tokenized transaction account to the client device.

10. The system of claim 1, wherein the transaction account comprises a plurality of transaction data elements and a size of the first tokenized transaction account is equivalent to a size of the account data elements.

11. The system of claim 1, wherein the first update condition includes:

a user-specified condition;

a location-of-use condition that triggers the update of the first tokenized transaction account in response to a correspondence between a location of an additional terminal device involved in the pending purchase transaction and a specified geographic location;

a pattern of locations-of-use conditions that triggers the update of the first tokenized transaction account in response to a correspondence between a location of one of the prior purchase transactions and the specified geographic location;

a product condition that triggers the update of the first tokenized transaction account based on an association between a specified product and the pending purchase transaction or one of the prior purchase transactions;

a product type condition that triggers the update of the first tokenized transaction account based on an association between a specified type of product and the pending purchase transaction or one of the prior purchase transactions;

a business entity condition that triggers the update of the first tokenized transaction account based on an association between a specified business entity and the pending purchase transaction or one of the prior purchase transactions;

a business entity type condition that triggers the update of the first tokenized transaction account based on an association between a specified type of business and the pending purchase transaction or one of the prior purchase transactions;

or a user profile condition that triggers the update of the first tokenized transaction account based on an association between a user of the device and a specified demographic characteristic.

12. The system of claim 1, wherein the transaction account comprises a plurality of account data elements, and wherein the executable instructions, when executed by the at least one processor, causes the at least one processor to further perform the steps of:

generating the first tokenized transaction account, wherein the step of generating the first tokenized transaction account comprises:

generating a first token from a first one of the account data elements; and replacing the first account data element in the account data elements with the first token.

13. The system of claim 12, wherein:
the executable instructions, when executed by the at least one processor, causes the at least one processor to further perform the step of generating a second token from a second one of the account data elements; and
the step of generating the updated first tokenized transaction account comprises replacing the second account data element in the account data elements with the second token.

14. The system of claim 13, wherein: the first account data element comprises a plurality of sub-elements of account data; and the step of generating the first tokenized transaction account further comprises:
generating a third token from a first one of the account data sub-elements; and
replacing the first account data element in the account data elements with the third token.

15. The system of claim 13, wherein the first account data element comprises a plurality of sub-elements of account data; and the step of generating the first tokenized transaction account comprises:
generating a third token from a combination of the first account data element and the first one of the account data sub-elements; and
replacing the first account data element in the account data elements with the third token.

16. The system of claim 1, wherein the executable instructions, when executed by the at least one processor, causes the at least one processor to further perform the steps of:
receiving a signal broadcast by a device associated with a retailer, the signal comprising information identifying a geographical location of the associated device or the retailer; and
generating the updated first tokenized transaction account in response the information included within the received signal.

17. The system of claim 16, wherein the executable instructions, when executed by the at least one processor, causes the at least one processor to further perform the steps of:
based on the pending purchase transaction data, establishing a correspondence between a location associated with the pending purchase transaction and the geographic location of the associated device or the retailer; and
generating the updated first tokenized transaction account in response to the established correspondence.

18. The system of claim 1, wherein the executable instructions, when executed by the at least one processor, causes the at least one processor to further perform the steps of:
determining a level of confidence in the first tokenized transaction account, based on the determination that the subset matches the geographic positions of
the terminal devices, the level of confidence being indicative of a risk that the first tokenized transaction account is compromised; and
establishing the predetermined time period in accordance with the determined level of confidence.

19. The system of claim 18, wherein a magnitude of the temporal delay is consistent with the established level of confidence.

20. The system of claim 1, wherein the executable instructions, when executed by the at least one processor, causes the at least one processor to further perform the steps of:
generating and transmitting a first signal to the client device via the communications interface, the first signal comprising the first tokenized transaction account; and
generating and transmitting a second signal to the client device via the communications interface, the second signal comprising the updated tokenized transaction account.

21. A computer-implemented method, comprising:
generating and storing, by a server device, a first update condition for determining whether to update a first tokenized transaction account at a client device;
providing, by the server device, the first tokenized transaction account to the client device, the first tokenized transaction account constituting a secure digital representation of a transaction account;
obtaining, by the server device, pending purchase transaction data involving a transaction account, the pending purchase transaction data including the first tokenized transaction account;
in response to obtaining the pending purchase transaction data, determining, by the server device, that the first update condition applies to the pending purchase transaction data;
determining, by the server device, that an update to the first tokenized transaction account is required based on the determination that the first update condition applies to the pending purchase transaction data;
based on the determination that the update to the first tokenized transaction account is required, obtaining, by the server device, first location data of prior geographic positions of the client device and second location data of geographic positions of terminal devices that processed prior purchase transactions involving the transaction account;
determining, by the server device, that a subset of the prior geographic positions of the client device matches the geographic positions of the terminal devices;
based on the determination that the subset matches the geographic positions of the terminal devices, delaying, by the server device, the required update of the first tokenized account for a predetermined time period;
detecting, by the server device, that the predetermined time period has expired; and
in response to the detection that the predetermined time period has expired, performing, by the server device, an update to the first tokenized transaction account and providing, by the server device, the updated first tokenized transaction account to the client device.

22. The method of claim 21, wherein the first update condition establishes a limit on a value of the pending purchase transaction.

23. The method of claim 21, wherein:
the pending purchase transaction data identifies products involved in a pending purchase transaction;
and the first update condition establishes:
a first limit on a cost of a corresponding one of the products;
or a second limit on an aggregate cost of the products.

24. The method of claim 21, wherein the modifying comprises:
associating the first tokenized transaction account with a first purchase functionality;
modifying the first purchase functionality in accordance with the first update condition;
establishing a second purchase functionality based on the modified first purchase functionality; and associating the updated first tokenized transaction account with the second purchase functionality.

25. The method of claim 21, wherein:
the pending purchase transaction data identifies the prior purchase transactions involving the transaction account and the method further comprises:
associating the first tokenized transaction account with a first purchase functionality;
determining, based on the pending purchase transaction data, an average value of the prior purchase transactions or a frequency of the prior purchase transactions;
establishing the second purchase functionality in accordance with the average value or frequency; and
associating the updated first tokenized transaction account with the second purchase functionality.

26. The method of claim 21, wherein the method further comprises:
identifying an instance of potential fraudulent activity involving the transaction account; and
generating the updated first tokenized transaction account in response to the identified instance of potential fraudulent activity.

27. The method of claim 21, wherein:
the pending purchase transaction data identifies the prior purchase transactions involving the transaction account; and
the method further comprises delaying the update of the first tokenized transaction account for the predetermined time period.

28. The method of claim 21, wherein the modifying comprises refreshing the first tokenized transaction account.

29. The method of claim 21, further comprising:
based on the pending purchase transaction data, determining that a second update condition applies to the pending purchase transaction data;
generating second tokenized transaction account from the first tokenized transaction account in response to the determination that the first and second update conditions apply to the pending purchase transaction data; and
providing the second tokenized transaction account to the client device.

30. The method of claim 21, wherein the transaction account comprises a plurality of account data elements, and wherein a size of the first tokenized transaction account data is equivalent to a size of the account data elements.

31. The method of claim 21, wherein the first update condition includes:
a user-specified condition;
a location-of-use condition that triggers the update of the first tokenized transaction account in response to a correspondence between a pattern of locations-of-use conditions that triggers the update of the first tokenized transaction account in response to a correspondence between a location of one of the prior purchase transactions and the specified geographic location;
a product condition that triggers the update of the first tokenized transaction account based on an association between a specified product and the pending purchase transaction or one of the prior purchase transactions;
a product type condition that triggers the update of the first tokenized transaction account based on an association between a specified type of product and the pending purchase transaction or one of the prior purchase transactions;
a business entity condition that triggers the update of the first tokenized transaction account based on an association between a specified business entity and the pending purchase transaction or one of the prior purchase transactions;
a business entity type condition that triggers the update of the first tokenized transaction account based on an association between a specified type of business and the pending purchase transaction or one of the prior purchase transactions; or
a user profile condition that triggers the update of the first tokenized transaction account based on an association between a user of the device and a specified demographic characteristic.

32. The method of claim 21, wherein the transaction account comprises a plurality of account data elements; and the method further comprises:
generating the first tokenized transaction account, wherein the step of generating the first tokenized transaction account comprises:
generating a first token from a first one of the account data elements; and
replacing the first account data element in the account data elements with the first token;
generating a second token from a second one of the account data elements; and
the step of generating the updated first tokenized transaction account comprises replacing the second account data element in the account data elements with the second token.

33. A tangible, non-transitory computer-readable medium having computer executable instructions stored thereon, that when executed by at least one processor, cause the at least one processor to perform the steps of:
generating and storing a first update condition for determining whether to update a first tokenized transaction account at a client device;
providing the first tokenized transaction account to the client device, the first tokenized transaction account constituting a secure digital representation of a transaction account;
obtaining pending purchase transaction data involving a transaction account, the pending purchase transaction data including the first tokenized transaction account;
in response to obtaining the pending purchase transaction data, determining that the first update condition applies to the pending purchase transaction data;
determining that an update to the first tokenized transaction account is required based on the determination that the first update condition applies to the pending purchase transaction data;
based on the determination that the update to the first tokenized transaction account is required, obtaining first location data of prior geographic positions of the client device and second location data of geographic positions of terminal devices that processed prior purchase transactions involving the transaction account;
determining that a subset of the prior geographic positions of the client device matches the geographic positions of the terminal devices;
based on the determination that the subset matches the geographic positions of the terminal devices, delaying the required update of the first tokenized account for a predetermined time period;
detecting that the predetermined time period has expired; and
in response to the detection that the predetermined time period has expired, performing an update to the first tokenized transaction account and providing the updated first tokenized transaction account to the client device.

\* \* \* \* \*